United States Patent
Peters et al.

[19]

[11] Patent Number: 5,884,284
[45] Date of Patent: Mar. 16, 1999

[54] TELECOMMUNICATION USER ACCOUNT MANAGEMENT SYSTEM AND METHOD

[75] Inventors: J. Michael Peters; Barry Battista; Christopher Brown, all of Boston, Mass.

[73] Assignee: Continental Cablevision, Inc., Boston, Mass.

[21] Appl. No.: 906,962

[22] Filed: Aug. 6, 1997

Related U.S. Application Data

[63] Continuation of Ser. No. 401,602, Mar. 9, 1995, Pat. No. 5,696,906.

[51] Int. Cl.⁶ .................................................... G06F 17/60
[52] U.S. Cl. ................................... 705/30; 348/1; 348/3; 348/6; 348/7; 705/34; 705/400
[58] Field of Search .................................. 348/1, 3, 6, 7; 364/400; 705/1, 30, 34, 400

[56] References Cited

U.S. PATENT DOCUMENTS

| | | | |
|---|---|---|---|
| 4,346,442 | 8/1982 | Musmanno | 705/36 |
| 4,422,459 | 12/1983 | Simson | 600/515 |
| 4,684,980 | 8/1987 | Rast et al. | 348/7 |
| 4,695,880 | 9/1987 | Johnson et al. | 348/6 |
| 4,754,426 | 6/1988 | Rast et al. | 348/7 |
| 4,761,684 | 8/1988 | Clark et al. | 348/7 |
| 5,019,900 | 5/1991 | Clark et al. | 348/3 |
| 5,089,885 | 2/1992 | Clark | 348/7 |
| 5,166,976 | 11/1992 | Thompson et al. | 380/15 |
| 5,185,794 | 2/1993 | Thompson et al. | 380/17 |
| 5,202,929 | 4/1993 | Lemelson | 382/116 |
| 5,206,722 | 4/1993 | Kwan | 348/7 |
| 5,220,501 | 6/1993 | Lawlor et al. | 380/24 |
| 5,243,647 | 9/1993 | Parikn et al. | 380/4 |
| 5,251,324 | 10/1993 | McMullan, Jr. | 455/2 |
| 5,267,312 | 11/1993 | Thompson et al. | 380/19 |
| 5,280,572 | 1/1994 | Case et al. | 369/49 |
| 5,283,819 | 2/1994 | Glick et al. | 379/93.01 |
| 5,287,270 | 2/1994 | Hardy et al. | 705/34 |
| 5,291,477 | 3/1994 | Liew | 370/238 |
| 5,291,554 | 3/1994 | Morales | 380/5 |
| 5,303,229 | 4/1994 | Withers et al. | 370/490 |
| 5,311,325 | 5/1994 | Edwards et al. | 348/5.5 |
| 5,319,455 | 6/1994 | Hoarty et al. | 348/7 |
| 5,321,541 | 6/1994 | Cohen | 359/127 |
| 5,325,290 | 6/1994 | Cauffman et al. | 705/34 |
| 5,347,632 | 9/1994 | Filepp et al. | 395/200.32 |
| 5,359,642 | 10/1994 | Castro | 379/121 |
| 5,592,551 | 1/1997 | Lett et al. | 380/20 |
| 5,696,906 | 12/1997 | Peters et al. | 380/5 |
| 5,727,055 | 3/1998 | Ivie et al. | 379/156 |

*Primary Examiner*—Edward R. Cosimano
*Attorney, Agent, or Firm*—Stephen C. Glazier

[57] ABSTRACT

The present invention is an integrated computerized system and method of telecommunication user account management. The invention creates, maintains, processes and analyzes data regarding individual users for telecommunication services. Billing for individual users is generated. The user data is analyzed and reports for all or part of the user data are prepared and generated. Ancillary functions are enabled, including word processing, editing, e-mail, and other functions. The invention is applicable to subscriber telecommunication services, and pay-for-use services, and the user may be a subscriber or a non-subscriber. The invention is applicable to multi-channel telecommunication services, or single channel multi-service telecommunications, or single channel single service telecommunications. Such telecommunication services may include cable television, telephone, video, audio, on-line databases, television, radio, music video, video juke box, pay-for-view, video-on-demand, interactive TV, home-shopping, video conferences, telephone conferences, interfacing to imaging systems, automatic telephone call charge-backs ("900" numbers), and other telecommunication services which may not yet be invented at this time. The current preferred embodiment of the invention is for subscriber account management for cable television services.

50 Claims, 14 Drawing Sheets

Fig. 4

DPL  Subscriber Inquiry  9-Jan-94
(Richmond)

Account : 1883322 -- Active  Pri (804)555-3322
Name : JANE DOE  Alt (804)555-4433
Address : 2211 BRADY ST 23211  SSn 222-33-4444

Transaction History

| Date | Transaction | Operator | Debit | Credit | Balance |
|---|---|---|---|---|---|
| | Previous Balance | | | | 0.00 |
| 25-Sep-93 | Payment-Sales | Batch 7716 | | 36.40 | -36.40 |
| 27-Sep-93 | Debit for Installation Charge | Ashburn | 0.99 | | -35.41 |
| 27-Sep-93 | Debit for Basic | Ashburn | 32.30 | | -3.11 |
| 27-Sep-93 | Debit for HBO | Ashburn | 19.90 | | 16.79 |
| 10-Oct-93 | Invoiced, Due 1-Nov-93 | | 36.40 | | 53.19 |
| 31-Oct-93 | Batch Payment | Batch 3772 | | 53.19 | 0.00 |
| 8-Nov-93 | Service 2-Dec-93 Thru 1-Jan-94 | Due 1-Dec | 36.40 | | 36.40 |
| 30-Nov-93 | Batch Payment | Batch 4182 | | 36.40 | 0.00 |
| 10-Dec-93 | Service 2-Jan-94 Thru 1-Feb-94 | Due 1-Jan | 36.40 | | 36.40 |
| 28-Dec-93 | Batch Payment | Batch 4523 | | 36.40 | 0.00 |
| 8-Jan-94 | Service 2-Feb-94 Thru 1-Mar-94 | Due 1-Feb | 36.40 | | 36.40 |

Next Uninv Current Over 30 Over 60 Over 90 Deposit Equip Wrt-Off Total
.00  .00  36.40  .00  .00  .00  .00  .00  .00  36.40

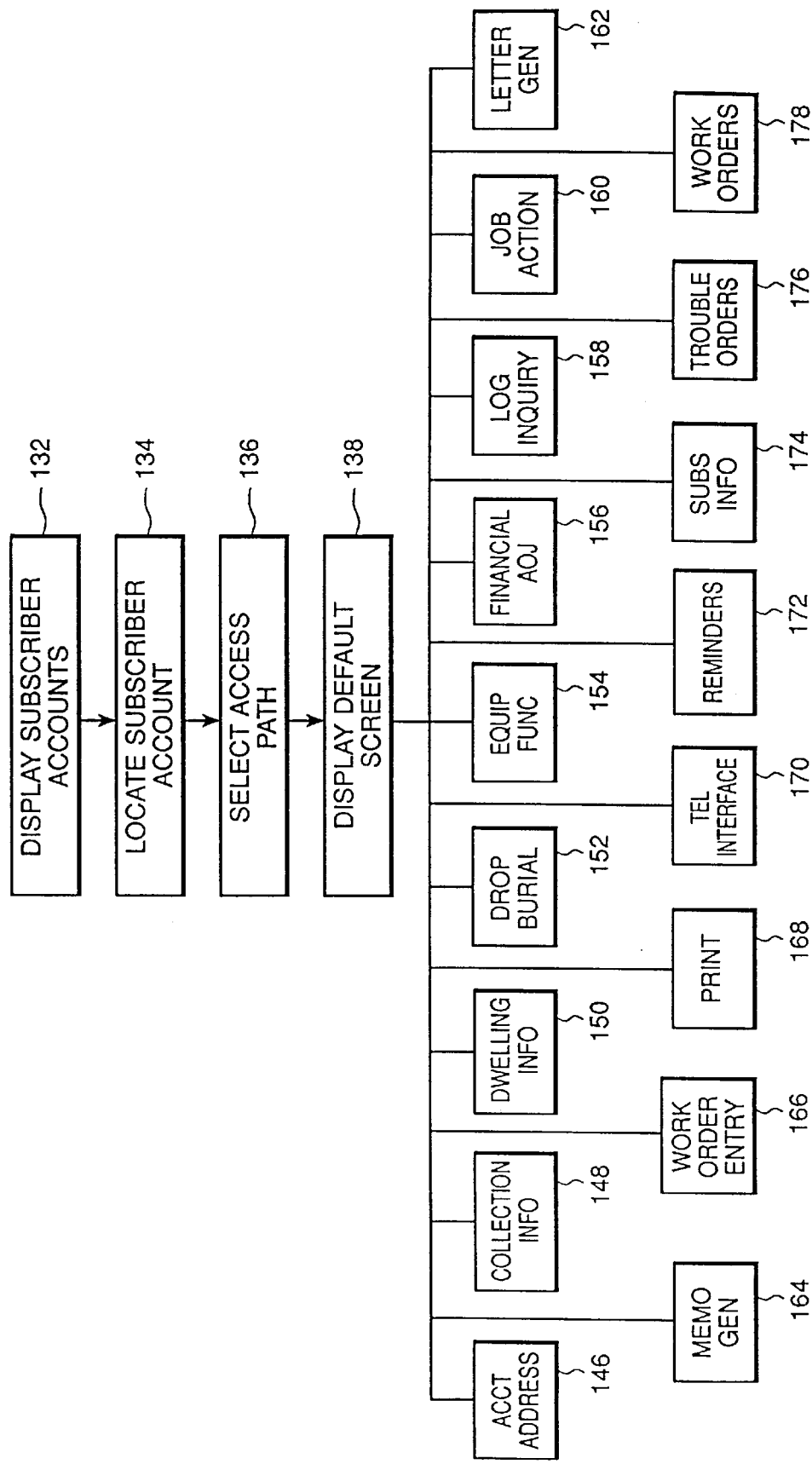

Fig. 9

Job Action Management

11-Apr-94

11-Apr-94

Enter desired function

A = Add Job
R = Add to an Address Range
F = Add Jobs for Audits
I = Return Job as Incomplete
M = Modify Pending Job
C = Complete Job
X = Modify Completed Job
V = View or Print Job Choice : A

190

TELECOMMUNICATION USER ACCOUNT MANAGEMENT SYSTEM AND METHOD

This is a continuation of application Ser. No. 08/401,602, filed Mar. 9, 1995 now U.S. Pat. No. 5,696,906, issued Dec. 9, 1997.

1. FIELD OF INVENTION

The present invention is in the field of telecommunication user account management systems and methods, for both interactive and non-interactive telecommunications. More specifically, the present invention involves an integrated system to create, maintain, and analyze individual telecommunication user account information. Furthermore, the invention generates a variety of billing, maintenance, operations reports and other output from such information, on both an individual user and a system-wide basis. Furthermore, the system offers a variety of ancillary functions regarding such data and generated output, including e-mail, word processing, and other functions. One embodiment of the invention is for subscription cable television services, including pay-per-view services, as well as direct-to-home satellite television services, but the invention includes embodiments applicable to every telecommunication service. Users may be subscribers or non-subscribers.

2. BACKGROUND OF INVENTION

The advent of cable television systems initiated a system of providing multi-channel subscription telecommunication services. The cable systems required monthly billing to subscribers, and other operations such as maintenance and management. To address these activities, a variety of distinct computerized systems and methods were developed piecemeal over time to individually address one of these topics and functions. Individual subscriber billing systems were developed. Management information systems for monitoring and reporting for an entire system were developed. Various other systems were developed. This activity took place in an environment with other ancillary computer functions and communications, including word processing, e-mail, and other functions.

However, these systems developed piecemeal over time and were not integrated. They involved multiple and incompatible database formats, software, hardware platforms, and communication protocols. Consequently, the data and functions of one system often cannot interact with the data and functions of other systems.

Consequently, a need exists for an integrated system and method to provide all the databases, billing, reports, and ancillary communications and processing functions, for individual subscribers, and for the entire system and subscriber base, in a quick and economic manner.

Additionally, the cable television industry specifically, and telecommunications generally, is in a dynamic technologic and regulatory environment that makes for an evolution of the mix of services provided by telecommunication companies. This has created a need for information management and processing systems that are flexible and adaptable to a changing mix of services supplied to subscribers, with each subscriber picking from a menu of possible services, on a monthly subscription basis, or a one time pay-for-view basis, or otherwise. Furthermore, some services, such as telephone, may be provided on a pay-for-use basis to non-subscribers.

3. SUMMARY OF THE INVENTION

It is an object of this invention to provide a single integrated data processing, computing, and communication system for all telecommunications service companies. It is a further object to be able to service one office, or multiple offices and regions of a telecommunications company. It is a further object to use a single, unified, compatible database format. It is a further object to provide a flexible and expanding variety of data processing functions, reports, analyses, ancillary functions, and other functions. It is a further object to be able to operate on a flexible variety of hardware architectures and environments. It is a further object to be able to use and integrate software application packages of others. Other objects may also be served as discussed and implied further herein.

The present invention is a computerized system and method for storing data for telecommunication services, executing data functions on the data, generating reports from the data, and performing ancillary functions.

The present invention may be an integrated computerized system and method of telecommunication user account management, for both interactive and non-interactive telecommunications. The invention may create, maintain, process, and analyze data regarding individual users for telecommunication services of all types. Billing for individual users may be generated. The user data may be analyzed and reports for all or part of the user data prepared and generated. Ancillary functions are enabled, including word processing, editing, e-mail, and other functions. The invention is applicable to subscriber telecommunication services, and pay-for-use services, and the user may be a subscriber or a non-subscriber, and the services may be interactive or non-interactive. The invention is applicable to multi-channel telecommunication services, or single channel multi-service telecommunications, or single channel single service telecommunications. Such telecommunication services may include cable television, direct-to-home satellite television or telephone services, including pay-per-view services, telephone, video, audio, on-line databases, Internet access, television, radio, music video, video juke box, pay-for-view, video-on-demand, interactive television, home-shopping, video conferences, telephone conferences, interfacing to imaging systems, automatic telephone call chargebacks ("900" numbers), and other telecommunication services. The current preferred embodiment of the invention is for subscriber account management for cable television services.

4. BRIEF DESCRIPTION OF THE DRAWINGS

The present invention may be better understood with reference to the detailed description in conjunction with the following figures where like numerals denote identical elements, and in which:

FIG. 4 is a subscriber inquiry menu screen available to a user according to the present invention.

FIG. 5 is a flow diagram of the options available from the display subscriber information (DPL) option of the present invention.

FIG. 9 is a job action menu screen available to a user according to the present invention.

5. DETAILED DESCRIPTION OF THE PREFERRED EMBODIMENT

5.1. Hardware Platform

Figure 1:
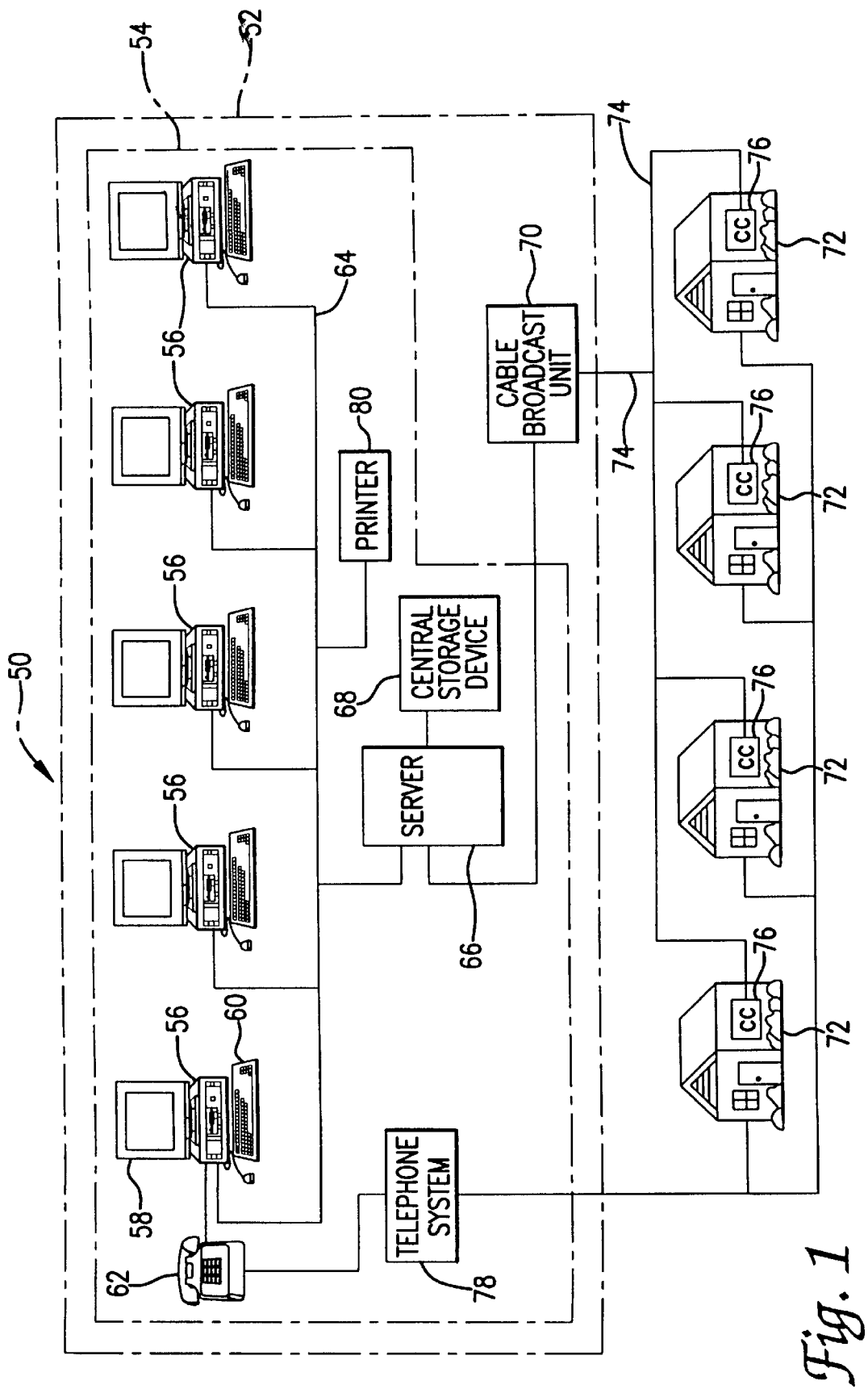
FIG. 1 is a block diagram of a computer network and a cable subscription service which incorporates the present invention.

A prototype of the present invention is currently under development and in confidential use at cable television facilities of the assignee of the patent, Continental Cablevision, Inc. ("CCI"), a cable television provider. This preferred embodiment of the present invention is referred to as SAM, an acronym for "Subscriber Account Management."

The SAM embodiment currently is used for subscriber account management, and acts as a network which links communications between the various CCI cable television systems. The computers in each CCI region have their own databases, and are able to communicate with the computers and databases in the other CCI regions. SAM permits the operation of all SAM functions for CCI in one centralized location. Hence, for example, CCI personnel at CCI headquarters can generate and review the information and reports described herein for all the CCI offices and regions, by accessing and processing through the system, the various databases of CCI offices and regions.

The SAM embodiment of the invention uses a VMS (Virtual Memory System) operating system. Currently, SAM operates on DEC (Digital Equipment Corporation) VAX (Virtual Address Extension) computers using VMS 5.5 or 6.0. The SAM software source code is written in Fortran.

Currently, all of the CCI offices around St. Louis and all of the CCI offices in Michigan operate SAM on one computer through remote terminals. In each office, personal computers with network cards and/or dumb terminals are used for the remote terminals. A separate database for each office is kept on the computer and the databases can be accessed directly from each terminal on that computer. The computer communicates through the SAM network with the other computers in the SAM system at CCI.

In contrast, each CCI office in Virginia currently has its own computer, running the SAM software (rather than there being one computer for the state being accessed through remote dumb terminals or PCs). Each computer in each CCI office in Virginia has its own database for that office, and can communicate through the SAM network with the other SAM computers at the other CCI offices.

The VMS operating system runs various applications software, including SAM, the well-known spread sheet program, LOTUS 1-2-3 (Trademark), the well-known word processing program WORDPERFECT 3:0 (Trademark).

Another developmental prototype of SAM is planned for confidential use on a system of two DEC Alpha 2100 servers, model A500 MP-R AXP RISC. A rack-mounted configuration is planned. Each server system will have one gigabyte of ECC memory, redundant ethernet cards, 4 CPU modules, one console monitor, and two PSSI busses in each cluster. Disc space will total 30 gigabytes, with 15 RZ28 two gigabyte drives. Tapes will include a TZ87-TA 20 gigabyte cartridge tape drive, a TL206 four MM tape drive, and a TSZ07 nine track tape. The software is planned to include at least a QL-MT 3AB-BR 256 User VMS license (cluster wide), a VMS cluster license, a TCP/IP software license, C++ Personal Use, Fortran Personal Use, Disk Striping, Disk Mirroring, FMS Runtime, DEC RDB Runtime, and, of course, the SAM source code. In addition, other applications software may be added.

FIG. 1 illustrates a cable subscriber system 50 according to one possible embodiment of the present invention. The cable subscriber system 50 is centered around a cable service provider 52, which is typically a local franchised cable company. The service provider 52 provides cable television services to subscribers typically over a specific geographic region. The service provider 52 provides billing, cable service, installation, and special channel services to its subscribers. In order to efficiently utilize their resources, the service provider 52 stores, updates, and processes information relating to these services.

Such information processing is performed in the present invention by a computer program installed on a computer local area network (LAN) 54 located at the service provider 52. The computer local area network 54 may be a minicomputer based system, a mainframe based system, or a network of personal computers. In one preferred embodiment, the computer local area network 54 is a VAX-VMS system. The network 54 has a basic operating system which allows users to run application software, access data, and communicate with other users. The network 54 gathers information from user terminals as well as cable broadcast facilities, as described below.

The network 54 has a number of user terminals or nodes 56. Each user terminal 56 has a monitor 58 and input device 60 such as a keyboard or mouse and may be provided with a phone 62. Each node 56 may be a personal computer or workstation. Each user terminal 56 provides cable employees, such as customer service representatives (CSRs), with access to information regarding subscribers such as maintenance information, account information and other data as will be described below. The user terminals 56 are connected via bus line 64 to a server 66. Multiple servers 66 may be connected in the network.

The server 66 may be a mainframe computer, minicomputer or personal computer. The server 66 is coupled to a central storage device 68. Data and application software stored in the central storage device 68 are accessible by all of the user terminals 56. The central storage device 68 may be a hard drive, a tape drive, or more permanent storage device such as a multiple CD stack player. A combination of storage devices may also be utilized as the central storage device 68.

Each user terminal 56 allows cable provider employees to access various network functions through a standard log in procedure. The log in procedure typically requires the user to enter an ID as well as a password. Once a user signs on the network, the user is allowed access to files and data stored in the central storage 68 as well as the ability to use application programs. In the preferred embodiment, users may access an electronic mail software application in order to send data and reports as will be detailed below. Additionally, users may access word processing software applications or spreadsheet software applications. Users may also be allocated storage space in central storage 68 for data files.

The cable system 50 broadcasts cable programming via a cable broadcast unit 70 which allows cable television signals to be broadcast to subscriber dwellings 72 through a cable network 74. The cable network 74 is typically composed of coaxial cables or optical fibers, although other means of communication may also be utilized by the present invention, including telephone lines, electric power lines, wireless telephone, cellular telephone, microwave, radio, direct satellite-based communications, or other means now in existence or to be developed. The broadcast unit 70 is controlled by the server 66 which allows cable employees, through terminals 56 to enable and change cable service to the subscriber dwellings 72. The broadcast unit 70 also transmits subscriber information to the server 66 for further use in activities such as billing or maintenance.

Each cable is connected a cable converter (CC) 76 which is located in each individual subscriber dwelling 72. The cable converter 76 may be programmed to allow a subscriber to receive special channels on a permanent basis. Also, the cable converter 76 may be programmed via the cable network 74 from the broadcast unit 70 to allow access to programming at certain times such as pay-per-view (PPV) events. In the case of pay-per-view events, a special enabling signal would be broadcast from broadcast unit 70 to enable an individual converter to decode the program for a set amount of time. A telephone system 78 may serve to connect individual cable employees at user terminals 56 with a telephone 62 to each subscriber home 72 in order to facilitate service.

The computer local area network 54 may be administered by a supervisor at a user station 56, the supervisor having personal priority codes allowing special access privileges and commands. The supervisor or system administrator may choose to allow different levels of access to applications and subscriber information depending on a user's job description. Reports summarizing various subscriber and cable activities may be generated by users on terminals 56. An output device such as a printer 80 is attached to server 66 via data bus 64. The server 66 may receive data files from the user terminals 56 to be output on printer 80.

The present invention is a comprehensive computer program for subscriber account management ("SAM") which is installed on the network or computer system 54. The present invention allows individual users or employees of a cable company to assemble reports regarding particular subscribers or groups of subscribers from the terminals 56. One preferred embodiment of the present invention is a subscription account management program which offers a user numerous options through several program modules. The options available to a cable system employee operating SAM are described below.

5.2. Database and Data Structure

The preferred embodiment of the present invention maintains data in a database for each CCI cable television system. The software maintains and updates the databases through execution of specific software functions, analyzes and processes the information in the databases, produces reports and other communications based on the data in the databases, and performs other functions such as e-mail, word processing, and spreadsheets.

The data maintained by the present invention includes individual subscriber data. A data record is maintained for each subscriber. Each subscriber record has various fields, including a separate field for: name, address, telephone, elected subscriber services and special channels, and other fields. Information is updated by various functions of the system described below, controlled by users at system terminals, and information can also be updated automatically, such as for pay-for-view services.

A database is also maintained for each office for equipment. A data record is maintained for each item of equipment to be tracked. Each equipment record contains various fields, including fields for stock number, franchise, project identification, and transaction date.

A database is also maintained for each office for converters. A record is maintained for each individual converter to be tracked. Each converter record contains various fields, including fields for: serial number, current location, last twenty locations, and addressable map.

A database is also maintained for each office for dwellings serviced for subscribers. A record is maintained for each dwelling served. Each dwelling record contains various fields, including fields for: dwelling number, current and last account address, and franchise. (The term "dwelling" as used herein actually means any location serviced by the cable systems or the telecommunications in question. These serviced locations are usually human habitations but also include non-habitations such as offices, restaurants, and other commercial establishments.)

Other databases are maintained for each CCI office for: alternate addresses, work orders, service orders, jobs, street names, franchise information, debit/credit codes, apartments, and campaigns. This is further shown in FIG. 11, and discussed below in the section hereof about FIG. 11.

The databases are all in compatible format and can be accessed by the software in the system to update the contents of the databases, or to generate appropriate reports.

A significant feature of the present invention is the ability to compile categories of information which are input through the various user terminals 56 regarding individual subscribers. The subscriber data may include maintenance information, billing information, service information, address and identification information and audit information. The information compiled regarding individual subscribers is contained in databases stored in the central storage 68.

Figure 11:
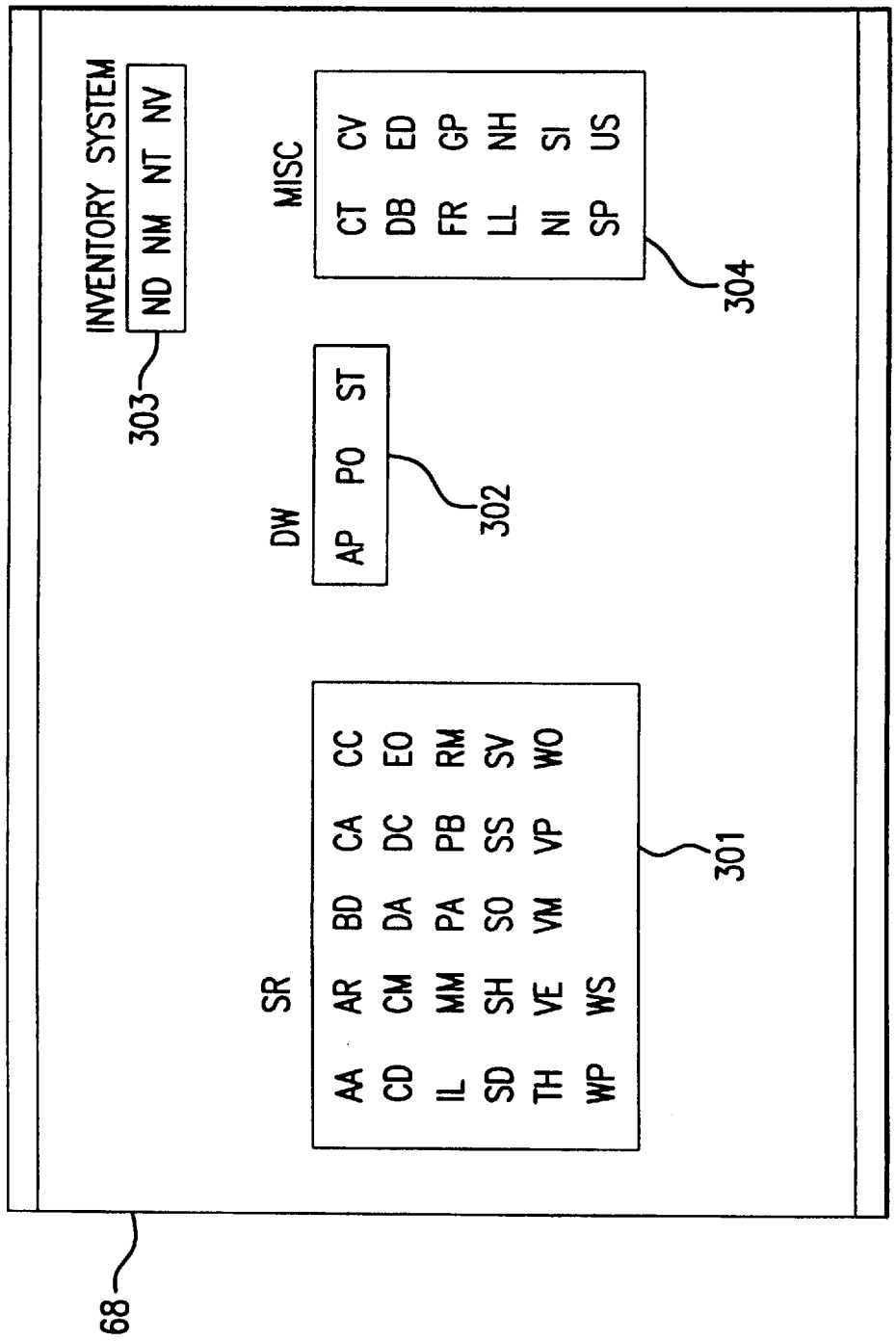
FIG. 11 is a block diagram of the data stored in the central storage according to the present invention.

FIG. 11 is a block diagram of the categories of data contained in the central storage device 68. The data is of four general types: subscriber (SR) information, dwelling (DW) information, inventory system information, and miscellaneous (MISC) information.

Subscriber (SR) information is contained in a subscriber database 301 and includes data files for alternate address (AA), accounts receivable (AR), drop burials (BD), collection action (CA), credit card (CC), collections disconnected (CD), campaign (CM), disconnect action (DA), debit credit (DC), end of the month/year EO), inquiry log (IL), memos (MM), pending actions (PA), payment batch (PB), reminders (RM), scheduling/assignment definitions (SD), transaction history (SH), service order (SO), system scheduling (SS), franchise/rates (SV), transaction history (TH), event file (VE), event master file (VM), event purchase (VP), completed work orders (WO), pending work orders (WP), and work scheduling (WS).

Dwelling (DW) information is contained in a subscriber database 302, and includes data files for apartment number (AP), post office box number (PO), and street address (ST).

Inventory system information is kept in an inventory system database 303, and includes data files for inventory distribution (ND), inventory master number (NM), inventory transactions (NT), and inventory vendor (NV).

Miscellaneous (MISC) information is kept in a miscellaneous database 304, and includes data files for code tables (CT), converters (CV), data base direction definition (DB), service edit definitions (ED), franchise (FR), general purpose (GP), list processing (LL), post office header (NH), post office transaction (NI), selective insertion (SI), SAM parameters (SP), and user (US).

The databases for SAM may maintain the full transaction history for each subscriber, and not just information for current or recent transactions. The types of transactions may include transactions such as billing, payments, pay-for-view orders, work orders, service calls, converter returns, and any other transaction. Users of SAM are given access to the complete transaction history in order to display the data, to perform data processing functions, and to generate reports.

Similarly, complete transaction histories may be kept, accessed, displayed, processed, and reported for trouble orders, dwelling transactions, work orders, converter transactions, pay-per-view transactions, and other types of transactions.

SAM may also perform a "transaction processing system" function. This function can develop an audit trail for all activities or any type of activity done in or by the cable office. For example, this function may track all interactions between particular subscribers and particular SAM employees, both for transactions implemented in the field and for record keeping transactions in the office. This can help to monitor and detect a range of activities, including employee productivity and fraud.

The present invention may also provide the function of a plant inventory system, to track all the parts necessary to build a complete cable system. This is currently being done in the CCI embodiment for the Southern California region of CCI.

5.3. Functions

The databases are maintained, processed, analyzed, and a variety of reports and bills are generated. In the CCI preferred embodiment, the functions are categorized as (1) DPL (display) User functions, (2) SAM menu user functions, and (3) supervisor functions and reports. The DPL user functions and SAM menu user functions are intended primarily for review or modification of individual data records. The supervisor functions and reports are intended primarily for the use by supervisors in dealing with office-wide administration and the generation of management information from the system. Furthermore, the CCI embodiment can produce a large variety of reports based on all or part of the databases in the office. In addition, the CCI embodiment can produce an extensive variety of forms, bills, and labels from the database, and reports from system processes.

5.3.1 DPL User Functions

The DPL user functions are of several types including: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, and work order.

The alternate address functions include: additional account information, forwarding address, alternate guide address, alternate invoice address, previous address, refund address, and snowbird address. The additional account information is a view-only function and does not alter database contents. The other alternate address functions alter the indicated information for a selected individual subscriber.

The collection activity function is a view-only and report category of function, and includes collections activity, collection summary, and disconnect tracking activity.

The dwelling function allows the user to view information about the current account or previous accounts that occupy a dwelling, and include dwelling history and dwelling information.

The drop burial function allows the user to enter, modify, view, complete and return drop burial jobs. Drop burial functions include: modify drop burial job, complete drop burial job, field complete and return a drop burial job, return a drop burial job, schedule a drop burial job, view a drop burial job, and cancel a drop burial job.

The equipment functions allow the user to work with various equipment associated with SAM services. The equipment includes addressable converters, conventional converters, converter handsets and digital cable radio tuners. The equipment functions include change out, sending out of addressable signals, layout, move, placement, remedy, serviceability, and addressable converter service display.

The financial adjustment functions allow the users to make debit/credit adjustments to accounts, subscriber records, equipment records, and other data. The functions include financial adjustment approval, miscellaneous credit, miscellaneous debit, equipment debit/credit, front counter payment processing, installment plan processing, modify marketing discount, invoice account, debit for pending pay-per-view events, deposit account refund, service adjustment, transfer balance, void pending adjustment, write-off balance/account, and help screen.

Inquiry logging functions create an on-line audit trail of transactions by automatically logging all account inquiries, logging user-typed comments to clarify a transaction for other users that subsequently look at the account, logging a system-defined code which logs a comment such as "billing inquiry", and logging a SAM process. SAM automatically logs in an entry when a disconnect notice is generated, when an extended outage occurs, and during modifications of work orders or subscriber information.

Request for action functions allow the user to view, modify, print, return, complete, and delete miscellaneous jobs which are not related to work orders or service orders. These functions include: add job order, complete job order, modify job order, return job order, and view job order.

The letter or memo function allows the user to create, edit and print form letters which include account information from the SAM database.

The memo function allows the user to create, modify, delete, and view memos which relate to the account that has been identified. These functions include: collection/credit memo, dwelling memo, equipment memo, location memo, memo summary, subscriber comment memo, and help screen.

The order entry function allows the user to enter and schedule work orders. These functions include entering an order to change services, entering an order to disconnect a subscriber, entering an order to reconnect a subscriber, modifying the scheduled date and time of an order, entering an order to transfer the subscriber, and help screen.

The print function allows the user to print a subscriber report, a copy of a work order or service order, an invoice, or a subscriber's transaction history. The function includes: printing a transaction history, printing a duplicate invoice, printing a current DPL screen, printing a trouble order, and printing a work order.

The telephone interface functions permit a user to quickly interface phone calls to subscribers. SAM automatically dials the subscriber's telephone number and forwards the call to the user's extension. These functions include: calling a subscriber's alternate phone number, calling a subscriber's primary phone number, and changing a telephone extension number.

The reminder functions allow SAM to automatically remind the user about payment or miscellaneous arrangements that have been made with the subscriber. These functions include: miscellaneous reminder including a personal "to do" list, payment reminder, reminder summary, and help screen.

The display subscriber functions allow the user to view, enter, modify, and print information about the subscriber that has been identified. These functions include a subscriber transaction summary, transaction history, invoice record, modify subscriber billing information, modify subscriber address, subscriber equipment inquiry, subscriber financial summary, general subscriber information, modify subscriber information, qualify selective inserts and message, non-standard rates entry, current services inquiry, default transaction summary, flag dwelling, flag subscriber, and help screen.

The trouble order functions allow the user on-line access to any trouble order function. These include: complete trouble order, delete trouble order, modify completed trouble order, trouble order history, enter/modify trouble order, add subscriber to outage list, return trouble order, trouble order schedule, National Cable Television Association ("NCTA") tracking for trouble orders, and help screen.

The utilities functions are a group of miscellaneous functions to enhance the use of SAM functions. These functions include display billing information, display flashing message, cable channel lineup, SAM message center, service and rate information by franchise, change defaults, SAM menu, and DPL screen, display upcoming pay-per-view events, and display system-edited bulletin boards.

Pay-per-view functions allow the user to select pay-per-view events, or view details of a list of events that have already been selected. These functions include: view details of pay-per-view events, list pay-per-view events, modify rate or pending pay-for-view order, pay-per-view order entry, select a pay-for-view event, cancel a pay-for-view event, and view pay-for-view events.

The work order function allows the user to modify, view and schedule existing work orders. These functions include: create a work order payment batch, complete work order, flag work order, work order history, work order summary list, modify work in progress order, return work order, modify work order services, cancel work order, work order detail, NCTA tracking information, and work order function help screen.

SAM may also have an addressable converter interaction function. This permits a CCI employee using the SAM system to change a subscriber's services from a SAM location remote from the subscriber's dwelling. The SAM system accesses the addressable converter in the subscriber's home with a signal that changes the list of services that the addressable converter will permit the subscriber to access through the cable system.

5.3.2 SAM Menu User Functions

The SAM menu user functions include functions of several types including: SAM menu, customer service functions, miscellaneous job functions, drop burial inquiry, dispatch, converter tracking, dwelling management, billing and collections, payment processing, and work order calendar and points.

The SAM menu functions include functions that a user needs to complete his job. Functions include display dwelling file, redisplay hello message, SAM print utility, and print subscriber data. The SAM menu can be customized for different user needs.

The display dwelling utility function allows the user to quickly view dwelling information for a specified address or other addresses on the street. This function is view-only.

The redisplay hello function allows the user to redisplay the hello message. The hello message is the first screen that the user sees when he or she accesses SAM.

The SAM print utility function allows the user to view and print files contained in the SAM print spool. Typically, the print files contain SAM reports and user generated files.

The print subscriber account function allows the user to create the subscriber summary report, which is a printed list of names and transactions on a subscriber account.

The customer service functions provide the user with information needed to serve customers. These functions include the FCP function and the RMD function. The FCP function allows the user to perform certain functions when operating a draw or add systems front counter. The RMD function keeps track of the payment arrangements and miscellaneous reminder messages that the user may have entered regarding the various subscriber accounts.

The job action management functions or miscellaneous job functions allow the user to enter, view, modify, print, return, complete and delete miscellaneous jobs which are not related to work orders or service orders, such as serviceability checks, cumulative leakage checks, trips to retrieve converters, sales prospects, audits, drop burials, and plant maintenance.

The drop burial function provides dynamic dispatching and on-line tracking of orders to bury a cable drop. (A drop is the cable running from the cable tap to the dwelling.) The drop burial functions include: enter or modify drop burial order, complete a drop burial order, field complete/return a drop burial order, return a drop burial order, return a drop burial order as incomplete, schedule a drop burial order, view a drop burial order, and cancel a drop burial order.

Dispatch functions include the service order inquiry and the work order inquiry. The service order inquiry function permits dynamic dispatching through instant on-line access to a pending trouble call that meets the specified qualifications. The work order function provides dynamic dispatching through instant on-line access to any pending work order that meets the specified qualifications.

The converter tracking function provides a full inventory of all types of converter equipment and identifies the specific area or persons responsible for each converter. The converter equipment includes: addressable converters, converter handsets, digital cable radio tuners, and PRIMESTAR (Trademark) integrated receiver-decoders. These functions include: addressable converter control, exit from SAM, display converter history, display subscriber accounts, redisplay hello message, add, modify or delete converters, modify converters and print files.

The dwelling management functions establish and modify accurate dwelling records. (The present invention maintains a dwelling records file as well as a subscriber records file.) These functions include: view dwelling history, view dwelling information, and a dwelling modifications menu to modify information in a dwelling record. SAM will also produce dwelling reports which are described elsewhere herein. The dwelling modification functions include: add dwelling, apartment modification, add street, exit from SAM, display subscriber accounts, display dwelling, redisplay hello message, modify dwelling addresses, modify dwellings, modify streets, print files, and view post office address.

The billing and collection functions create accounts for new cable subscribers and handle billing and collection tasks. A new account is added with an existing billing cycle. The billing cycle may be an anniversary cycle, a multiple cycle which allows monthly billing at a designated day within each month such as, for example, the ninth day, or a single cycle system which typically bills monthly on a calendar month. Billing can also be done on a quarterly, semi-annual, or annual basis. These functions also generate bills and disconnect notices and disconnect work orders. These functions also contain a disconnect tracking module that centralizes and automates collection activities on disconnected subscribers. This module also generates referrals to collection agencies, referrals to in-house collectors, form letters, lists, transaction history printouts, and tape formats. These transaction history printouts can include complete transaction histories of any and all types of transactions as discussed further elsewhere herein. These functions also contain payment processing functions where payments are entered, corrected and posted in a batch format. Work order calendar and point scheduling functions contain work order scheduling functions and work order point overviews. The work order scheduling WOS function creates a schedule and calendar of work order points. It also routes the work and creates a print file containing work order forms. The work order points overview TPS function displays the points available for the selected date sector and technician.

5.3.3 Supervisor Functions and Reports

The supervisor functions and reports include functions and reports of several types including: accounting functions, functions to manage users, reports, and miscellaneous functions.

The accounting functions allows supervisors to handle pending adjustments, notes to financial adjustments, changes in the billing cycle, recovering writeoffs, debiting/crediting converters, setting credit limits, batch approval for adjustments, FCP overrides (this function allows the supervisor user to process a front counter drawer that was created by another user), applying late fees, and making mid-month accounting reports.

The functions to manage users allow the supervisor to modify the access priority control system for users to control user access to various functions, to monitor users and the functions currently accessed by users in the system, to develop user profiles, and to add, modify and delete this information.

The preferred embodiment of the present invention includes recommended reports to be run on a daily, weekly, monthly, and as needed basis, by supervisors. Daily reports include work order reports (DATSCH, UNSCHD, and WPSUMM), payment batch reports (PAYMENT, PBATCH, and PBSUMM), service repair reports (SVOSCH), and converter inventory reports (INVENT, and LOLIST). Recommended weekly reports include missing converter reports (CVLOST and BXLOST), work order information reports (DUPWIP, NEWCHK, and WOCANX), refund reports (REFUND, REFSUM, and CRDRPT), and reports summarizing sales activity (SMOPER, SMCAMP, and SVOINQ).

Recommended monthly reports include collections reports (BALLST, COLECT, CALIST, and DUPSSN), technical reports (DAYACT, DSCRPT, RECONV, WOBACK, WOSUMM, SVOSUM, SVOOSD, and MTHSVO), and NCTA reports (TCRSUM, and WORSUM).

Furthermore, reports as needed can be run, including AUDITS, CMMDIR, SMCAMP, and SLSCRD.

Reports are also recommended for cable office personnel, to be run by technical personnel, warehouse personnel, accounting/collections personnel, work order control personnel, dispatchers, and PPV (pay-per-view) activity personnel. These reports are as indicated below.

Reports used by Technical Personnel:
DATSCH—Detailed List of Scheduled Work Orders—run daily.
UNSCHD—Unscheduled Work Orders—run daily.
BXLOST—Converter Loss Account Detail—run weekly.
JATACT—Job Action Detail Report—run weekly.
UNASGN—Unassigned Trouble Orders—run weekly.
OUTAGE—Service Outage Listing—run as needed.
THSVO—Summary of Trouble Calls (for St. Louis District only).
SVOSUM—Summary of Trouble Calls (for Virginia and Michigan).
SVOOSD—Summary of Trouble Calls (for Ohio only).
TCRSUM—Technical Response Time Analysis—run monthly.
WORSUM—Work Order Response Time Analysis—run monthly.

Reports used by Warehouse Personnel:
INVENT—Summary of equipment by location, with optional list of serial numbers—run daily.
LOLIST—Provides a form for moving converters at the front counter or at the warehouse—run daily or weekly.

Reports used by Accounting/Collections Personnel:
PAYMNT or PBATCH—Run daily to determine who has paid.
DCDTAL—Run as needed for Debit/Credit detail.
CALIST—Run weekly for accounts in collections.
CAXDIR—Lists number of accounts in each collections batch.
DSCPND—Run weekly for disconnect pending accounts.
REFUND and REFSUM—Run weekly for refunds.
CRDRPT—Run bi-weekly for accounts qualifying for a refund.

Reports used by Work Order Control Personnel:
DATSCH—Run daily or weekly.
WOCANX—Run weekly to list cancelled work orders.
UNSCHD—Run daily to identify unscheduled work orders.

Reports used by Dispatchers:
SVOSCH—Run daily to list/print incomplete trouble orders.

Reports on PPV (pay-per-view) Activity:
PPVCLR—Lists accounts that have exceeded PPV credit limit.
PPVEVT—Summary and optional detail of orders for a specific event title.
PPVHST—Summary of monthly PPV purchase patterns including multiple buys and comparison of event types.
PPVWIN—Lists controller and event ordering windows.
PVCNFT—Check for conflicting events.
PVCLTRR—Lists details of current events and previews.
PVLABL—Produces labels for mailings.
PVLIST—Lists all subscribers who selected an event.
PVTITL—Lists all events during the specified date range.

The content of these specific reports are further described elsewhere herein.

Figure 2:
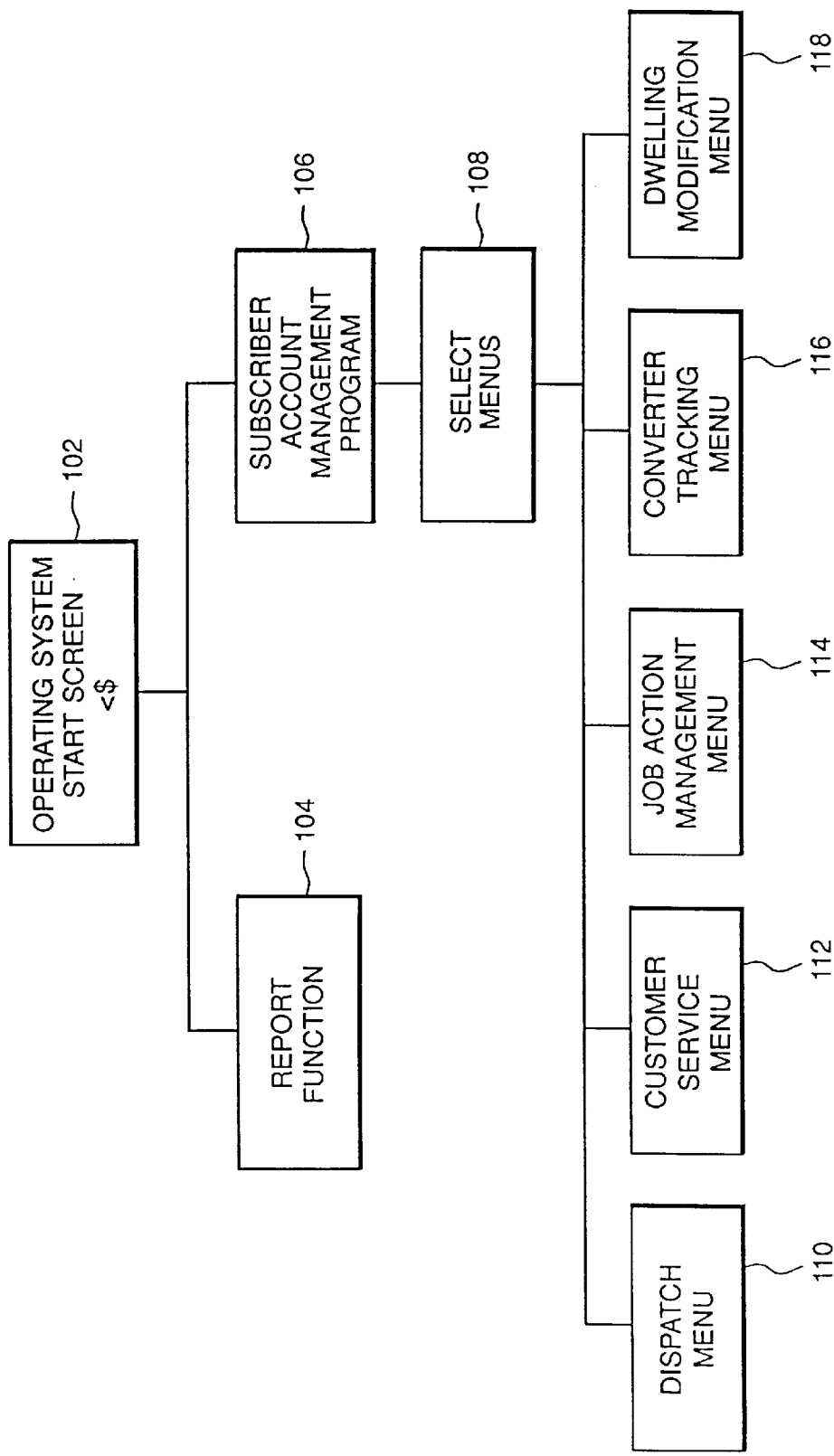
FIG. 2 is a flow chart of the options available to a user initially logged on to a computer operating system supporting a system according to the present invention.

FIG. 2 illustrates a flow chart of the options available to a user on an individual terminal 56 according to the present invention after logging in on the network 54. After a successful log in, a start screen 102 with a system prompt such as "$" in the VMS-VAX operating system will appear on monitor 58. The user may then enter a command for report function 104 (RPT) or a subscriber account management (SAM) program 106. The report function program 104 allows various reports to be generated depending on the information a user needs summarized. The report generation function program 104 depends on gathering comprehensive data from the subscription account management program 106.

If the subscriber account management program 106 is selected, it requires a user to select menus 108. In the preferred embodiment, there are five initial menu selections. These include a dispatch menu 110, a customer service menu 112, a job action management menu 114, a converter tracking menu 116, and a dwelling modification menu 118. Alternatively, a default menu such as the customer service menu 112 may be programmed to appear on screen when a user runs the subscriber account management program 106. Each of these menus have several common selection options and several unique selection options.

Figure 3:
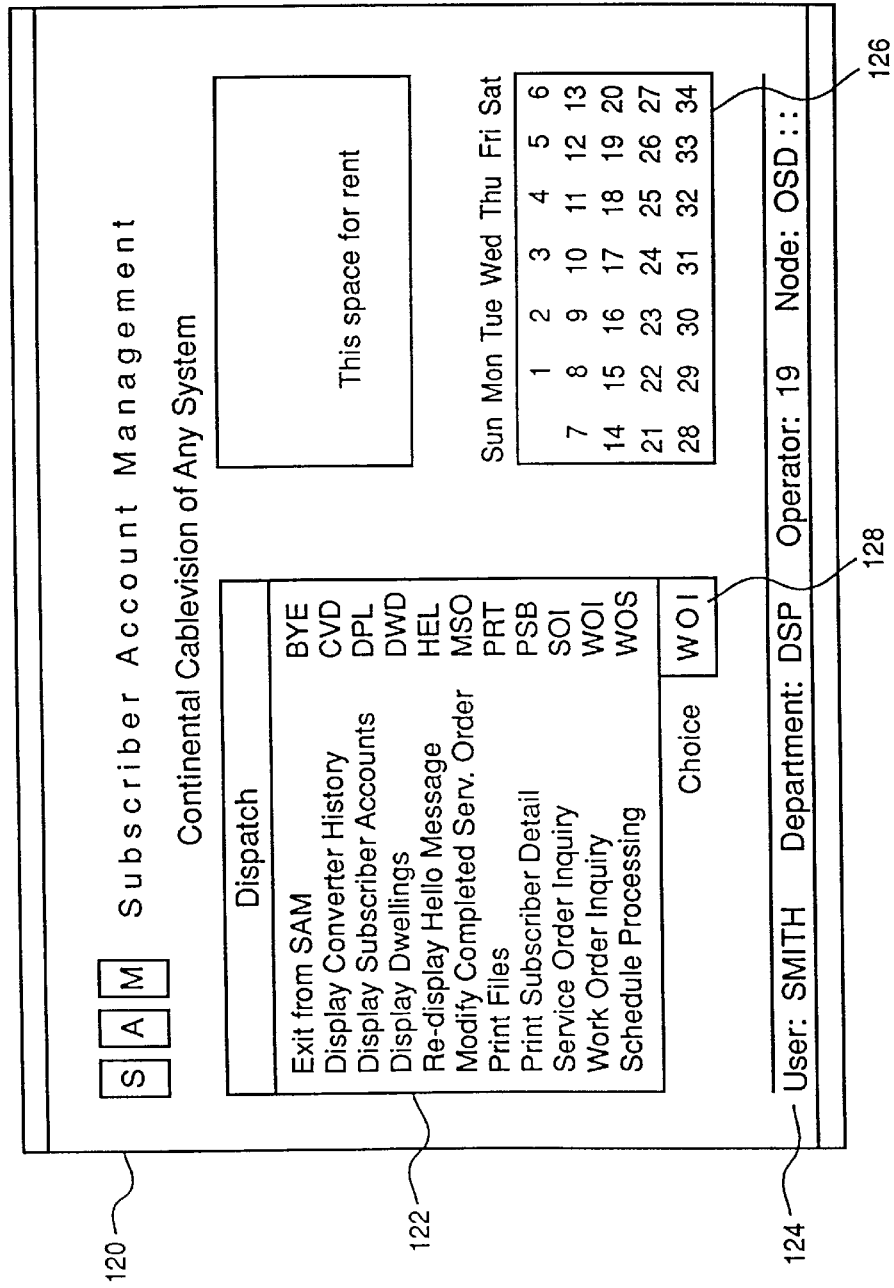
FIG. 3 is a dispatch menu available to a user according to the system of the present invention.

FIG. 3 is a menu screen 120 of the dispatch menu 110 as it appears on the monitor 58 to a user. The menu screen 120 displays a user options box 122. Certain options are unique to the dispatch menu 110, other options are common to all initial menus as noted above. The menu screen 120 also displays a node information area 124. The node information contained in area 124 may include the user name, the department, the operator number and the node identification. A calendar 126 may also be displayed. The options box 122 also includes a current selection box 128 which shows the current option selected by the user.

In the preferred embodiment, the options common to all initial menus include: 1) exit from SAM (BYE), which allows a user to end the SAM program; 2) redisplay hello message (HEL), which allows a user to redisplay a greeting screen; 3) display subscriber information (DPL), which allows viewing of subscriber accounts; print utility (PRT), which allows viewing and printing files contained in the print spool of the server 66; and print subscriber detail (PSB), which allows creation and printing of a list of financial transactions on subscriber accounts.

The display subscriber information (DPL) option allows a user access to information which is organized by the present invention. This option allows a user to access all pertinent information regarding each individual subscriber. FIG. 4 shows a subscriber information screen 130 which appears on monitor 58 when a user selects the DPL option and identifies a specific subscriber. FIG. 5 is a block diagram of the options available when the DPL option is selected.

With regard to FIG. 5, a user selecting the DPL option 132 will be prompted to locate subscriber account 134. The locate subscriber account step 134 allows a user to locate a specific subscriber by means of different criteria such as name, account number, converter number, social security number, or other criteria. Once a subscriber criteria is specified, the system selects access path 136 which allows the server to locate the data regarding the selected subscriber.

Figure 6:
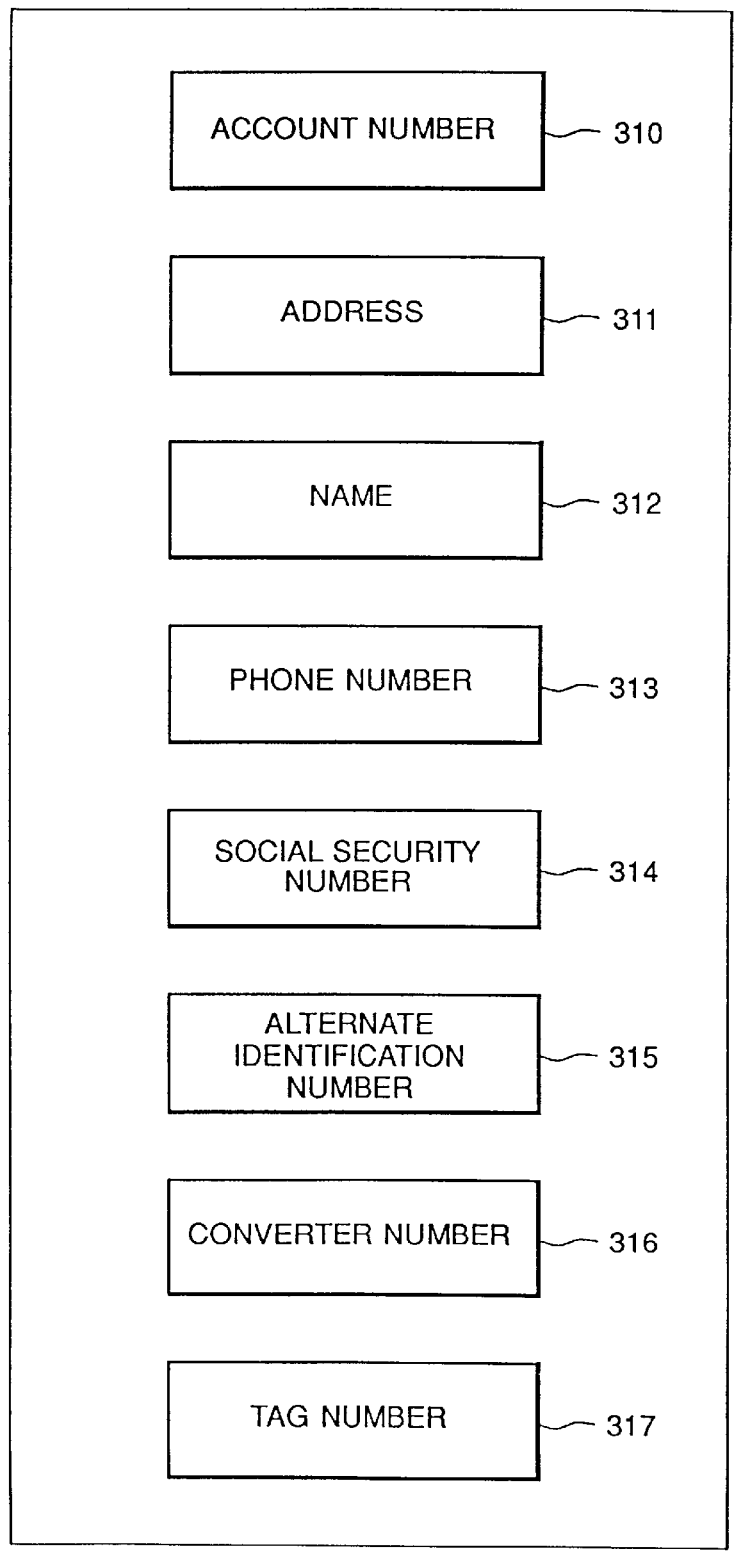
FIG. 6 shows the types of data records that may be used to find a subscriber account record to display.

FIG. 6 shows the types of data records that may be kept for each subscriber and used by the locate subscriber account step 134. The account number 310 is unique for each subscriber. The address 311, name 312, telephone number 313, social security number 314, alternate identification number 315, converter number 316, and tag number 317 may or may not be unique for each subscriber. The alternate identification number 315 may be the driver license number, old account number, or other number for the subscriber. The user selects the types of data records to be searched to locate subscriber accounts, and the user inputs the value of that record type to be searched for among all such records for subscriber accounts.

The account number 310 is unique for each subscriber account, and searching for a particular account number will find no more than one subscriber account. The other record types (such as, for example, address) may not be unique, and a search for a certain requested record value (that is, for example, a certain address) will return the first 30 subscriber accounts with that value (that is, for example, at that address). The user can then move through the list of located subscriber accounts with the up/down arrow keys on the keyboard to search for the single desired subscriber account.

Once select access path 136 is implemented, a default screen is displayed 138. The default screen display 138 is the subscriber information screen 130 in FIG. 4 in the preferred embodiment. With regard to FIG. 4, the subscriber information screen 130 contains a DPL header 140 which includes information such as subscriber name, account number, address, phone number and social security number. The DPL header 140 appears on every DPL screen. The subscriber information screen 130 also includes a transaction history box 142 which summarizes financial and billing transactions with the particular subscriber. Information in the transaction history box 142 may include a description of the services rendered, the operator or cable company representative, debits and credits and the net balance of the account. The subscriber information screen 130 also includes a billing summary area 144.

Returning to FIG. 5, once an individual subscriber screen is displayed on the default 130, numerous options may be selected by the user. Alternate address 146 allows a user to add, delete or modify alternate address information on the subscriber records. A collection activity option 148 allows a user to view the collection activity for active and disconnected subscriber accounts. A dwelling information option 150 allows a user to view information about a current or previous account which occupy a dwelling such as an apartment or home.

A drop burial option 152 allows a user to enter modify, view, complete or return cable burial and installation jobs assigned to installation personnel. An equipment function 154 allows a user to operate equipment such as converters, addressable converters, and cable radio tuners. The equipment function 154 also allows the user to order additional equipment. The equipment function 154 also allows the user to remotely program a converter to give a subscriber access to special channels or pay per view events.

A financial adjustment option 156 allows a user to make debit/credit adjustments to subscriber and other accounts. A log inquiry option 158 allows a user to create an on line audit trail of transaction by automatically logging account inquires, user typed comments and other processes. A job action management option 160 allows a user to enter, view, modify, print, return, complete, and delete miscellaneous jobs not related to work or service orders. These include serviceability checks, cumulative leakage tests, retrieval trips, sales trips, audits, cable drops, and installation of ground blocks.

A letter generation option 162 allows a user to create, edit and print form letters which include account information from subscriber information stored in the server storage. Similarly, a memo generation option 164 allows a user to create, edit and print memos which include account information from subscriber information stored in the server storage.

A work order entry option 166 allows a user to enter and schedule work orders to connect and disconnect subscribers. A print option 168 allows the user to print a subscriber record, copy of the work order or service order, invoice or a subscriber's transaction history. The printed record may be output on either the output device 80 or a printer which is specifically comparable dedicated to user terminal 56. A telephone interface option 170 allows the user to place telephone calls using the telephone system 78 and phone 62 to contact the individual subscriber listed on the default screen. The program according to the present invention automatically dials the subscriber number and forwards the call to the phone 62 associated with the user terminal 56.

A reminder option 172 allows a user to be automatically reminded about payment or miscellaneous arrangements made with an individual subscriber. A subscriber information function 174 allows a user to view, enter, modify and print information regarding a subscriber which has been identified. In order to maintain record integrity, most subscriber information maybe viewed by operators using terminals 56 however they may not be modified without higher access level regarding the network. A trouble option 176 allows the user to receive on-line access to service orders and/or service repair orders to modify, edit and view. A final option is a work function 178 which allows the user modify, view and schedule existing work orders for installation service or equipment.

Returning to FIG. 3, the dispatch menu 110 has a number of unique options associated with that particular menu. These options include: service order inquiry (SOI); technical points summary (TPS); work order inquiry (WOI); and schedule processing (WOS).

The SOI function provides dynamic dispatching through instant on-line access to any pending trouble call which meets specific qualifications. The SOI command allows the user to create an on-line list of the accounts with trouble calls, display details of trouble calls, assign a technician to trouble calls, display NCTA tracking standards, flag accounts for follow-up action, complete finished trouble calls, and return calls that are incomplete.

Figure 7:
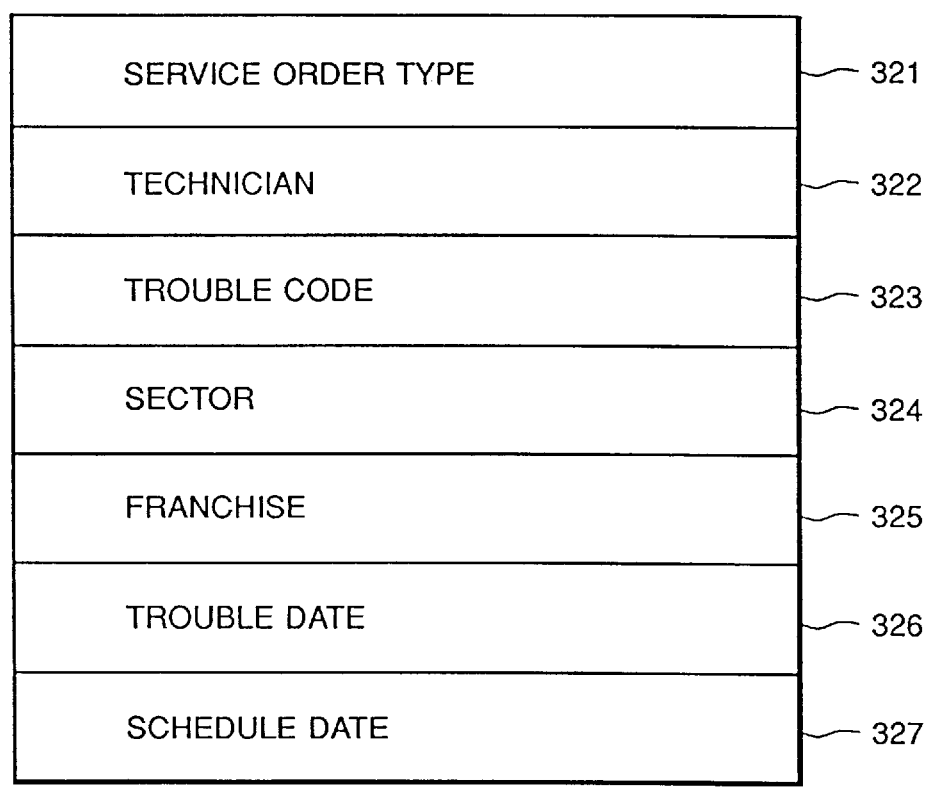
FIG. 7 shows the types of data records that may be used to search and select service orders by the service order inquiry function.

FIG. 7 shows the types of data records that the current embodiment keeps for each service order inquiry. The user can select types of records to be searched (for example, trouble date) and the value to be searched for (for example, all trouble dates in February 1994). The SOI function then searches all service orders in the indicated field for the indicated value, and presents a list of the resulting service orders which match the selected values for all the selected options. The user may then use the up/down arrow keys on the keyboard to scroll through the list. A single service order is always highlighted in the scrolling, and details of the highlighted order are displayed on the bottom of the user's screen. The user may select an individual service order and schedule it, modify it, or field complete the order.

The types of data records that are kept for each service inquiry include service order type 321, technician 322, trouble code 323, sector 324, franchise 325, trouble date 326, and schedule date 327.

The work order inquiry command, WOI provides dynamic dispatching through instant on-line access to any pending work order which meets specific qualifications. The WOI command automatically updates a subscriber database stored in the central storage 68 each time a work order is modified, returned or completed. The WOI command allows a user to specify qualifications for an on-line listed account with pending work orders, view and print the details of selected work order, modify services on a work order, sign in an installer or change the assigned installer, flag orders as field completed or field returned, and flag converters as issued or retrieved. Qualifications may be specified by entering a range of scheduled dates, scheduled locations, scheduled times and other information to limit the application of work orders.

Figure 8:
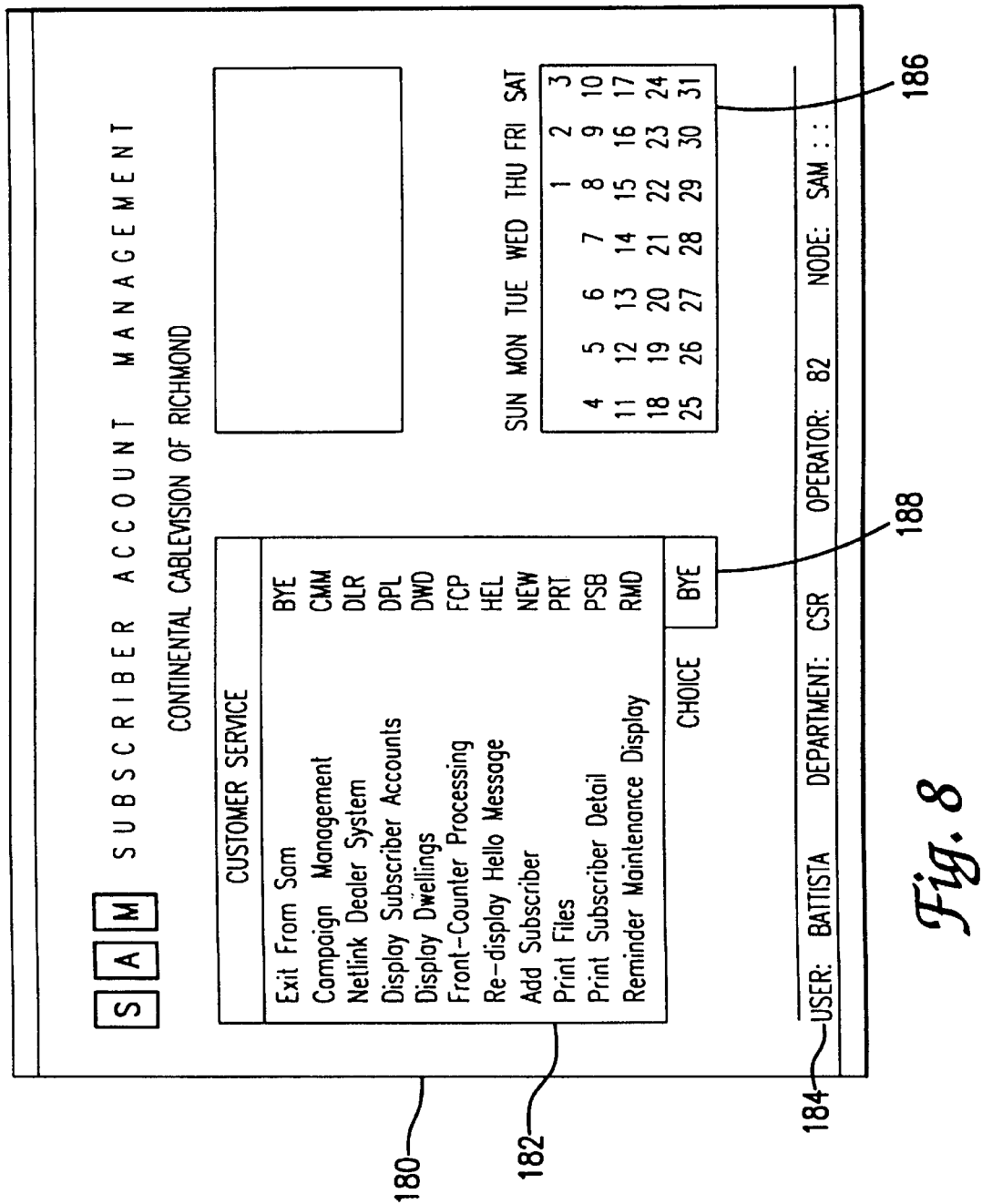
FIG. 8 is a customer service user menu screen available to a user according to the present invention.

The work order scheduling, WOS, function creates a scheduling calendar of work order points. Work order points are time units which are available to a particular installer or employee of the cable service. Therefore, efficient allocation of points is desirable to maximize and make efficient service to subscribers. The WOS command also routes work and creates print files containing the work order forms. The WOS command allows division of the orders into group categories and records the orders on the scheduling calendar. The WOS function is usually restricted to one or two users on the system and requires a special control access privilege. The technical points summary, TPS, function displays the points available for the selected date, sector, or technician. As noted above, the most frequently used menu in the preferred embodiment beginning from the initial subscriber account management program 106 is the customer service menu 112. FIG. 8 is the menu screen 180 of the consumer service menu 110. Similar to the dispatch menu, the customer service menu 180 contains a user options box 182, node information 184, and a calendar 186. The user's chosen option is indicated in option box 188 affiliated with the user options 182. As with the dispatch mode, the BYE, DPL, HEL, PRT, and PSB commands are available to the user, as well as other commands indicated in FIG. 8.

The customer service menu has a number of unique commands including: Modify Campaign Management File (CMM); Front Counter Processing (FCP), Display Dwelling File (DWD); Add A New Subscriber (NEW); and Reminder Maintenance Display (RMD). The CMM command is the modified campaign management file which allows the user to track limited time promotions and marketing cable services. The CMM feature allows a user to monitor, activate, modify, and terminate campaign services aimed at subscribers to the cable system. The DWD, function allows a user to quickly view dwelling information for a specified address or other addresses on the street. This function is view only, not allowing a user to modify or change any of the information on display.

The Front Counter Processing, FCP, function requires a special access privilege. The FCP command allows the user access to payment reports related to a specific subscriber, allowing a user to process the payment and record the transaction. The NEW function allows the user to add a new subscriber. The RMD function is a reminder function which keeps track of payment arrangements and miscellaneous reminder messages which have been entered in subscriber accounts. Each reminder contains a due date which will flash on the system alerting the user to a certain reminder.

A further option from the initial SAM program 106 is the job action menu 116. FIG. 9 shows a menu screen 190 which is viewed by the user when the job action menu 116 is selected. The menu allows a user to enter, view, modify, print, return, complete and delete miscellaneous jobs not related to service orders or work orders. These may include serviceability checks, cumulative leakage tests, retrieval trips, sales trips, audits, cable drops, and installation of ground blocks. There are a number of options available to the user from the job action menu 116.

The A option allows a user to add a job to a subscriber. The R option allows a user to add jobs to multiple dwellings on a street or a specific account number. The C option allows a user to record the completion of a job and delete it from the records. The M option allows a user to modify a job order. The V option allows a user to view or print a selected list of jobs. The lists may be based on job number, account or dwelling information or job order information. The F option allows a user to create an audit list of dwellings and services which meet selected criteria. This includes the option to modify or add jobs to the audit list.

A fourth option from the initial SAM program 106 is the converter tracking menu 116. The converter tracking menu allows a user to be provided a full inventory of all types of converter equipment and identification of specific areas responsible for each converter. The converter equipment menu includes tracking converters, converter headsets, digital cable radio antennas and PRIMESTAR(Trademark) integrated receiver decoders (IRD). Of course, other converters or equipment may be tracked using this program. The converter tracking menu 116 contains a number of unique commands to the menu aside from the standard BYE, DPL, ATL, PRT, PSB commands standard to the other four menus.

The ADC (addressable converter control) option allows a user to program more then one addressable converter or digital cable radio tuner. The ADC command also allows a user to program converter tuners for single count using the DPL functions noted above. The ADC function typically requires a special access privilege. The CVD function (display converter history function) allows the user to view a detailed list of transactions for an individual converter regarding access to special channels and/or pay-per-view. The screen information is view only, a user may not change the data displayed on the screen. The CVD function will also allow a user to track the location of a particular converter. The MCV function (add, delete or modify converters) allows a user to add, delete, or modify information regarding a particular converter. This command is useful to record the additional equipment into the table system 54 as well as maintaining current records regarding the converter's location or function.

The ADC option allows the indicated current location of a converter to be changed and updated, using the converter movement functions. In this way the converter location can be changed from a subscriber account location to a non-subscriber location, or from a non-subscriber location to a subscriber account location. The current embodiment has a location code table of up to 9,999 user defined non-subscriber locations that can be created to accommodate office tracking requirements, in addition to the locations indicated for each subscriber account. When the data files for an individual addressable converter are changed to indicate that the converter has been moved to a new subscriber account location, then the current embodiment of the invention automatically sets the service levels in the data files for the converter to match the service levels indicated in the data files for the new subscriber account. Data files for a non-subscriber location for converters can be configured so that SAM will either (1) turn-off all addressable services indicated in the data files for the converter when that converter's recorded location is changed to that non-subscriber location, or (2) reset the indicated service levels for that converter to the specific service levels associated with that non-subscriber location. The data files for each converter contain the last 20 locations for that converter, and the identifying opcode of the person who moved the recorder to each of those 20 locations.

Figure 10:
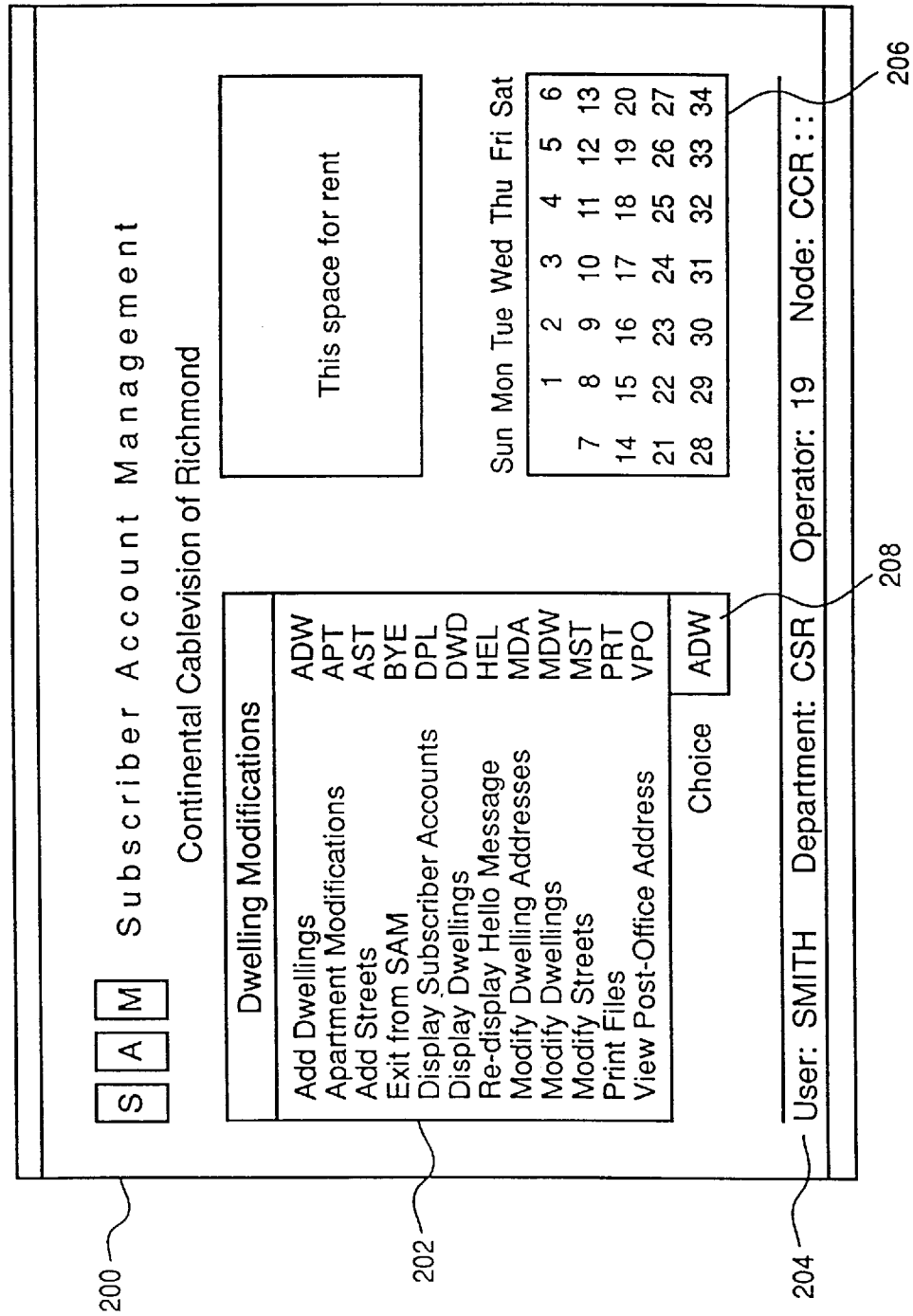
FIG. 10 is a dwelling modification menu screen available to a user according to the present invention.

The final menu available to a user initially running the subscriber account management program 106 is the dwelling modification menu 118: FIG. 10 is a menu screen 200 which is presented to a user when the user selects the dwelling modification menu 118. The dwelling modification menu 118 permits a user to access and update a dwelling record which is stored in the central storage device 68. A separate dwelling database containing dwelling files is maintained by the central storage device 68 as well as a subscriber database containing subscriber files.

The menu screen 200 contains a user option box 202, a node information area 204, and a calendar 206. A selection box 208 indicates the options selected by a user viewing the menu screen 200. Aside from the generic functions, BYE, DPL, PRT, PSB, and HEL the dwelling functions menu contain a number of unique commands.

The add dwellings (APW) function allows a user to add up to 15 dwellings on a single street, thus updating the dwelling's file. The apartment modifications (APT) function allows a user to view, add, modify billing information from apartment complexes. The add street (AST) function allows a user to add new street names to the system for the purposes of expanding a cable subscription service. The AST function cross-references new street names with a post office record database and notifies a user if a name is incorrectly spelled or not found.

The DWD function is identical to the DWD function under the customer service menu. The MDW (modified dwelling file) function allows a user to modify information regarding an existing dwelling, delete a dwelling or view dwelling on any given street. The MST, modified street file function allows a user to rename streets, delete streets, add or modify alternate street names or, an alternate town name. The VPO, view post office information allows a user to compare dwelling information on the dwelling files with the official post office record.

5.4. Reports.

Returning to FIG. 2, running the report function program (RPT) 104 allows the user to take advantage of the information contained in the central storage device 68. The report function program 104 compiles various reports utilizing the individual data. After a user has accessed the report function program 104, the program will display a report menu on the monitor 58. The program 104 according to the present invention displays the report menu appropriate for the user's employment function. Each report menu contains a number of different reports which may be generated by the report function program 104.

In the preferred embodiment, the report menus include Accounting (ACT), Collection Action (CAX), Campaign Tracking (CMM), Collections (COL), Consumer Service (CSR), Converter Tracking (CTS), Group Definition (DEF), Dispatch (DSP), and a work order report menu. Other report menus may be designated and designed according to the needs of the user's job description.

Figure 12:
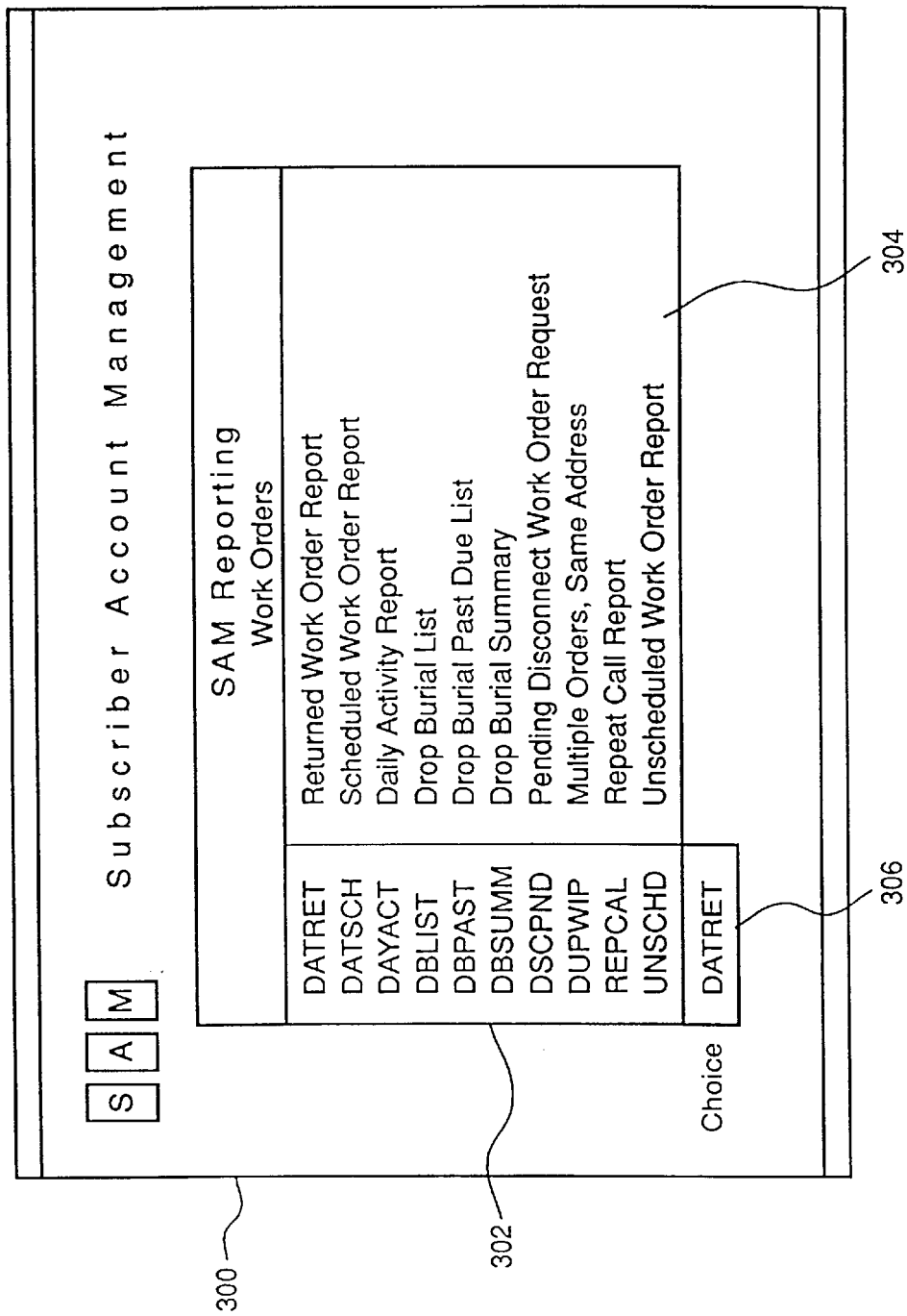
FIG. 12 is a report menu which is available to a user according to the present invention.

FIG. 12 shows a typical report menu relating to work orders. A work order report menu 300 contains a work order report box 302 which has a number of report options 304 which may be selected by the user. The user's current choice is highlighted in the selection box 306. At any time in the report function program 104, a user may view a list of report manuals by department, and select a menu with choices of ports to generate.

Figure 13:
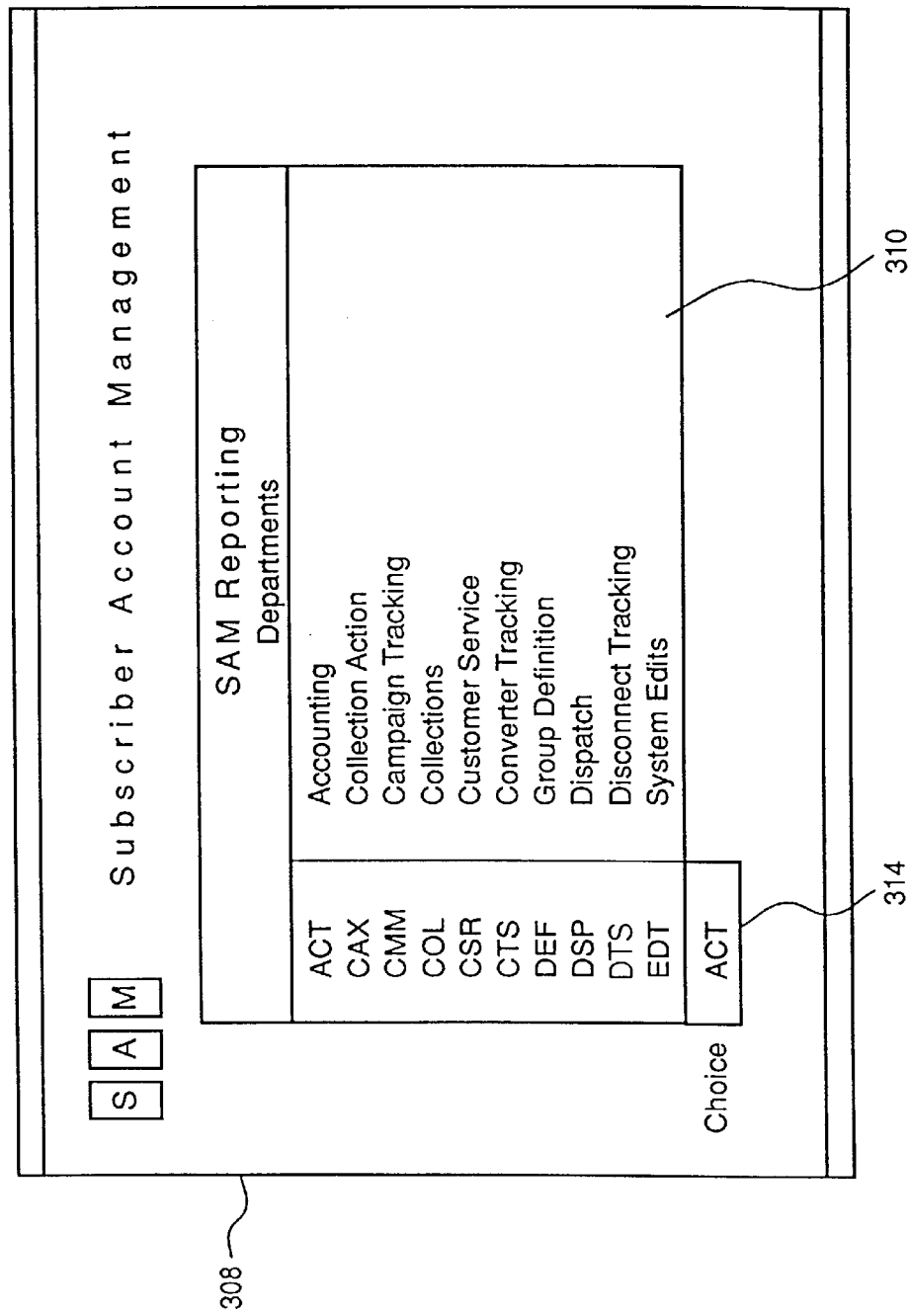
FIG. 13 is a department report menu screen which is available to a user according to the present invention.

FIG. 13 is a menu screen 308 which allows a user to choose between different report menus. The report menu 308 has a report menu box 310 which contains a number of report menu options which may be chosen by the user in a selection box 314. Once a user has selected a particular menu, the particular report menu such as the work order report menu shown in FIG. 12 would be displayed on the screen.

Turning back to FIG. 12, a typical report menu according to the present invention would give the user choices between several reports to generate. Once a user selects a specific report to be generated, the information relevant to the report is compiled by the server 66 from the files stored in central storage device 68.

Figure 14:
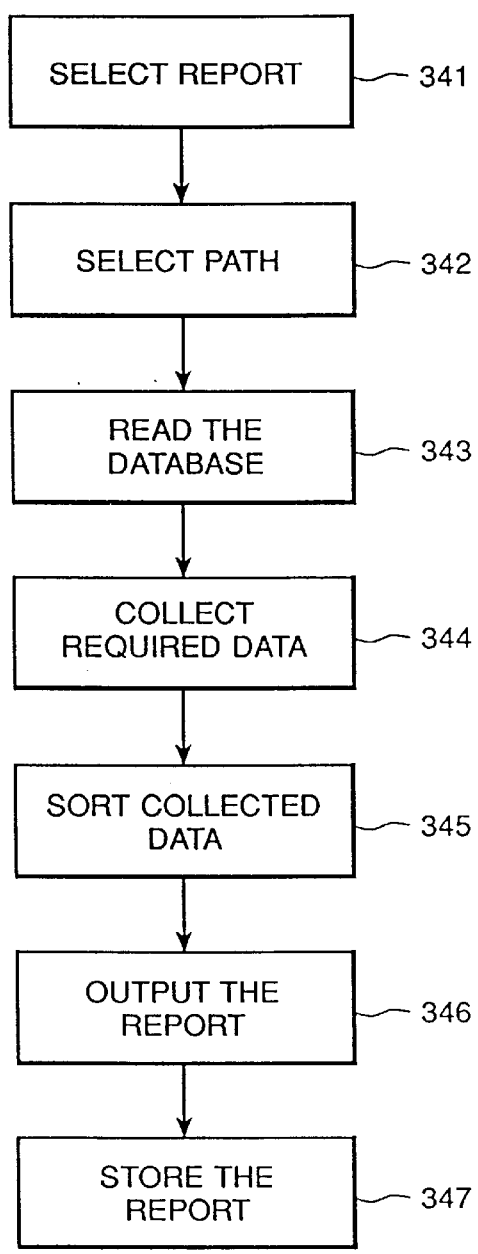
FIG. 14 is a flow diagram of the method used to compile reports according to the present invention.

FIG. 14 is a flow diagram showing the process of a typical compilation of a report. The user selects 341 the report to be generated. Then the current embodiment selects 342 the path to read 343 the database to collect the data for that report. Most reports collect data from the data files in the databases for subscribers, dwellings, and work orders. While reading 343 the database, SAM collects 344 the data required for the report by copying the collected data to a temporary file. SAM then sorts 345 the collected data into the order required for the report, and stores the sorted data in the temporary sort file. Then SAM outputs 346 the report to the user, and stores 347 the report into a report output file.

Once a particular report has been generated by the program according to the present invention, a user has a number of options which are available. A user may print the report using the PRT option in the subscription account management program 106. The PRT function also allows a user to send a report by e-mail which is installed on the computer network 54. A user may also view a finished report by entering a command which will display the contents of the report which has been generated.

The report program also allows a user to customize reports using services as column headings. Through the define command, a user may specify the service group affiliated with the particular definition. The report function also allows labels or forms to be generated based on generated reports. The reports may also be used in the audit functions described above.

A description of some typical reports from the CCI preferred embodiment includes the following:

ACCREC—Accounts Receivable Age Category Report. This report lists account receivable data in each age category.

ACCSUM—Accounting Summary Report. This report summarizes accounting data for the selected month and franchise.

ACSLST—Access Control by Access. This report lists all users, and the SAM functions to which the users have access. This report can be sorted by user or by access.

ADDOUT—Additional Outlet Service Summary. This report lists the number of active subscribers in each combination of multiple services and additional outlets. Press to select the franchise, minimum number of outlets, and the dwelling type (single family, apartment, etc.).

ALTADR—Alternate Address File Listings. This report provides summary and detailed information from alternate addresses updated within the selected date range.

APTDET—Apartment Detail Report. This report lists all dwellings and current subscriber services 1 the specified franchise and apartment complex.

APTDIR—Apartment Directory and Penetration Report. This report lists all apartments, the number of dwellings, and the service totals for the specified franchises.

APTLAB—Apartment Dwelling Labels. This report produces mailing labels for dwellings in the specified apartments.

APTLST—Apartment Dwelling/Subscriber Listing. This report lists dwelling and subscriber data, including account status and current balance, for each dwelling in the specified franchise and apartment complex.

APTSLS—Apartment Penetration by Salesman. This report lists all apartments, the number of dwellings, and the service totals for each salesman.

APTSVC—Apartment Services Report. This report lists all dwellings and their service levels for the specified franchise and apartment complex.

AUDITS—Audit Cards. This report is used to perform audits. It lists addresses and service level by the selected sales route and dwelling type.

BADCHK—Bad Check Detail Report. This report lists all accounts with bad checks or disconnect nonpaying entries within the specified date range.

BALLST—Subscriber Balance Report. This report lists accounts based on balances, and optionally produces a form letter or labels.

BXLOST—Converter Loss Account Detail. This report lists disconnected accounts that still have converters. This report lists all subscriber information, plus the sales route, converter serial number, disconnect date, and the balance by age category.

BYDATE—Customer Service DPL Inquiries. This report summarizes DPL inquires for the specified date range.

BYHOUR—Customer Service DPL Inquiries. This report summaries DPL inquiries for the spec-led date range.

BYREAS—DPL Inquiries by Reason. This report summarizes DPL inquiries for the specified date range.

BYSEQN—Debt/Credit Detail by Sequence Number. This report lists debit/credit detail by sequence number.

CAUST—Collection Action Lists. This report provides various formats for accounts currently in the collection action file.

CAXDIR—Collections Batch Directory. This report lists all collections batches, showing the total accounts in each batch.

CHKREG—Refund Check Register. This report lists the refund checks issued during the specified date range. The list includes the check number, account number, amount, and the name and address of the recipient.

CMMDIR—Campaign Directory. This report produces a directory listing of all campaigns whose active dates fall within the date range specified.

CMMDWL—Campaign Summary Report. This report summaries work orders by campaign(s). The report includes the subscribers' account, name, address, dwelling type, and serviceability.

CMMGEN—Campaign Detail, Summary, Labels Report. This report lists all orders taken for a given campaign. It provides subscriber names, addresses, service levels, and the effective date of completion or schedule date.

CMMRES—Campaign Results. This report analyzes the effect of the various campaigns on subscriber retention. The data may be sorted by salesman, sales route, census tract, or management area for the specified campaign.

CMMRET—Campaign Retention Report. This report lists all orders entered for the specified campaigns and summarizes retention information based on subsequent downgrades and disconnects.

CMMSLS—Campaign Service Report by Salesman. This report summarizes campaign activity by salesman for a date range and list of campaigns.

COLECT—Collection Report. This is the primary collections report. It sorts all active accounts by Salesman or Sales Route.

COLLOG—Collections Account Log. This report allows you to select a list of accounts for collection activities. The report provides the subscriber's name, address, account number, account status, plus service balance, equipment balance, and write-off balance.

COLSUM—Collections Summary Report. This report is used to assign collection accounts to salesmen.

COMBOS—Service Combinations Report. This report reads all subscriber accounts and lists all service combinations that currently exist in the database.

CRDLST—Credit Bureau Listing Report. This report produces a list of accounts with deposits required.

CRDRPT—Credit Report. This report lists all accounts disconnected on that date that contain a credit balance.

CTBLST—Code Table Listing. This report lists all user codes in alphabetical order.

CTSUBS—Active Subscriber Converter Report. This report lists all active subscribers who have been issued converter and sorts the list by converter serial number.

CVLOST—Converter Loss Report. This report lists all accounts that still have converters after being disconnected during the specified date range.

CVTOTL—Subscriber/Converter Summary. This report is a summary list of total debited converters by account status and convener type.

DATRET—Returned Work Order Report. This report provides information on all work orders returned as incomplete during the specified date range including issue and schedule dates, work order comment, work order services, and a summary of return reasons.

DATSCH—Scheduled Work Order Report. This report produces a detailed listing of all scheduled work orders for the specified date range and work order type, such as Installs, Disconnects, and Service Changes.

DAYACT—Daily Activity Report. This report summarizes the daily activity of completed work orders for the specified schedule date and service level.

DAYSUM—Daily Service Call Report. This report is a summary of service orders received during a specified range of dates.

DBLIST—Drop Burial List. This report provides a detailed list of drop burial jobs, and includes information from DBU and the DPL functions.

DBPAST—Drop Burial Past Due List. This report lists all drop burial orders which are past due for return of waiver, return of follow-up waiver, locate date, or until-ny marking expiration date.

DBSUMM—Drop Burial Summary. This report lists drop burial activity for the specified date range.

DBTIME—Drop Burial Duration Report. This report provides a detailed list of all completed drop burial orders, and shows the elapsed time between the receipt of the waiver and the number of days needed to complete the job.

DCDTAL—Debt/Credit Detail Report. This report provides detail entries for specific debit/credit codes.

DCOPER—Debit/Credit Operator Summary. This report summarizes all debit/credit entries for a specified range of dates. This report also lists the number of entries and total debt/credits for each operator.

DCSUMM—Debit/Credit Summary Report. This report summarizes all debit/credit entries made for a specified range of dates.

DEBRPT—Outstanding Debits on Disc. Accounts. This report lists all accounts with balances greater than the minimum balance that you specify.

DEFINE—Defme Service Group. This report allows you to define names for groups of services that you would like included in any report which uses services as column headings.

DEPOST—DEPOST Detail Report. This report lists accounts with deposits and/or accounts with deposit requirements that remain unsatisfied.

DFZSUM—Active Accounts by Zip Code. This report lists the active accounts and homes passed in each zip code.

DIDTAL—Discount Detail Report. This report provides details of accounts with active or expired discounts.

DISCNT—Subscriber Discounts. This report lists all accounts with active discounts.

DISCON—Disconnected Subscriber Converter Report. This report lists disconnected subscribers who have not returned their converters.

DMPDWD—Dwelling Dump Report. This report produces a list of all dwellings in the specified sales route.

DSCLAB—Disconnected Subscriber Tape Listing. This provides a magnetic tape listing of disconnected subscribers.

DSCPND—Pending Disconnect Work Order Report. This report lists subscribers who are about to be disconnected.

DSCRPT—Disconnected Subscriber Report. This report lists subscribers who were disconnected during the specified date range, by disconnect reason, optionally excluding accounts with payment arrangements. The data may be sorted by reason, by account number, by operator, by dwelling type, by sales route, or by effective disconnect date.

DSCSUB—Disconnected Subscriber Report. This report provides both list and tape output of subscribers disconnected within a date range. The report includes or excludes specific disconnect reasons and sorts by disconnect date and franchise.

DTSACT—Disconnect Tracking Activity Listing. This report lists accounts in the Disconnect Tracking System by the specified DTS action.

DTSCOL—Disconnected Account Balance Changes. This report lists referred accounts which has had an account balance change within the specified date range.

DTSLOC—Disconnected Account Location Listing. This report lists DTS accounts according to the location of the account (in-house or at a collection agency).

DUPSSN—Duplicate Social Security Number Report. This report lists all accounts with duplicate Social Security numbers, producing a cross reference.

DUPWIP—Duplicate Work Orders. This report examines all work orders and lists accounts that have two work orders for the same address.

DWADMD—Dwelling Add/Modify History Report. This report lists the date and operator responsible for adding or modifying dwellings during a specified date range.

DWEDWG—Dwelling Downgrade listing. This report lists current active subscribers whose service level is lower than the previous subscriber at their dwelling.

DWELAB—General Dwelling Labels Report. This report produces a mailing list for dwellings fitting the qualifications specified on this report screen.

DWELLS—Street Dwelling Report. This report lists all dwellings for the specified streets.

DWSTAT—Dwelling Status Report. This report lists dwellings by dwelling type and serviceability for the specified franchise, management area, or sales routes.

DWZSUM—Dwelling Serviceability by Zip Code. This report produces a table of dwelling serviceability totals by zip code.

EOMSUM—End of Month Summaries. This report analyzes various subscriber information to give ar overview of service levels, age of balances, unearned revenue, an prepaid income.

EQSUMM—Equipment Charge Summary. This report summarizes all debit/credit entries for equipment by convener type for the specified date range and franchise.

EQUIPM—Equipment Balance Summary Report. This report summarizes equipment balances by account type.

FCCLST—FCC Service Complaint Log. This report lists one line of information from all trouble calls received.

FRQRPT—Service Order Frequency Report. This report lists all accounts with multiple service calls during the specified date range.

GOODSR—Good Subscriber Report. This report selects active subscribers who meet the qualifications entered.

ILLIST—Account Inquiry Listing. This report lists all inquiries and messages made on subscriber accounts for the specified date range, operator, inquiry reason, and account.

INSLST—Insert/Massaging Listing. This report lists all current messages which appear on billing statements, and lists all current inserts along with the group of subscribers who will receive the inserts along with their statements.

INVENT—Converter Inventory Report. This report counts the number of converters listed at each location code and provides a summary by location.

JACCU—Cumulative Leakage Index Report. This report produces a Cumulative Leakage Index for jobs which were pending or completed between the specified dates.

JACCLR—JAC Cumulative Leakage Index Routing. This report provides a detailed list of pending leakage jobs. The output is sorted by job type (field leak or detected leak), sector, and leakage level.

JACCMP—Job Action Completion Report. This report summaries completed jobs, by technician, for the specified date range.

JACCOM—Completed JAC Jobs Report. This report provides various sort options for completed jobs.

JACDUP—Multiple Job Orders. This report examines all pending jobs, and lists addresses that contain more than one job.

JACFOL—Job Action by Follow-up Operator. This report produces a detailed listing of pending or completed jobs by follow-up operator and follow-up date, sorted by operator and job action code.

JACSUM—Job Action Summary Report. This report produces a summary of in-process and complete jobs.

JATACT—Job Totals by Action. This report produces a detailed list of pending jobs by job action code, or completed jobs by completion code. The list is sorted by franchise, action code, and entry date.

LABELS—General Subscriber Labels. This report produces a mailing list of subscribers who meet the qualifications specified on the report screen.

LABLST—Label/Address Listing Generator. This report produces an address and telephone list along with address labels and carrier sort labels for selected franchises and services.

LOLIST—Converter Location List. This report lists converters currently in the specified location.

MMUST—Memo Listing. This report creates a list of accounts containing memos.

MTHSVO—Monthly Service Calls, This report summarizes completed service or trouble orders by category for the specified date range.

NEWCHK—New Accounts Analysis. This report reviews new accounts for evidence of non-pay activity.

NEWNEW—Installed Subscriber Report. This report provides a detailed list of all subscribers installed, disconnected, or with changes to their work orders within a specified date range.

NEWSUB—The Subscriber Report. This report provides both a listing and tape output of newly installed subscribers within a date range. The output includes: name, address, primary phone number, account number, install date and services.

NOTICE—Disconnect Notices. This program generates disconnect notices to all accounts in the specified collections batch. A user can specify the final due date, and the disconnect message on the invoice. The invoices are placed in the file, NSRATE—Non-standard Accounts Report. This report produces a detailed list of service rates for non-standard accounts such as free accounts, municipal accounts (schools or government agencies), commercial accounts, hotels, motels, apartments, and special accounts.

OUTAGE—Outage Service Orders Report. This report lists all outages currently in the system by the specified date range.

PAYMNT—Payment Summary Report. This report summarizes all payment batches completed during the specified date range.

PAYRMD—Payment Reminder Report. This report lists accounts receiving a payment reminder, sorted by the operator and the due date.

PATCH—Print Payment Batch Detail. This report lists the detailed entries for each of the payment batches specified.

PBSUMM—Payment Batch Summary Report. This report summarizes all payment batches for a specified date range, and provides totals by franchise.

PNDWRK—Pending Work Order Report. This report produces a one-page output showing total orders, by type, scheduled for the next two weeks.

PPVCLR—Credit Limit Exceeded Report. This report displays regular and free accounts that have exceeded the PPV credit limit.

PPVEVT—Pay-Per-View Event Report. This report produces a summary anid an optional detail report for the specified event title. The information includes the date, time, channel, length, number of orders, and the cost of each event.

PPVHST—Pay-Per-View History Report. This report produces a summary of monthly PPV purchase patterns which compares types of events (movies to events) and includes counts of multiple purchases.

PPVWIN—Pay-Per-View Window Listing. This report is a general listing of events with event order windows.

PVBUYS—Pay-Per-View Purchases Listing. This report lists all buys for the events selected below for a specific subscribers or all subscribers.

PVCNFT—Pay-Per-View Event Conflict Checking. This report lists conflicting events by channel and by date range. It checks for conflicts in event scheduling and conflicts which occur when the pre-event order window precedes the starting time of the previous event.

PVCURR—List PPV Events and Previews. This report lists PPV events and previews for a specified date range to compare to the output of the PPV controller.

PVLABL—Pay-Per-View General Labels Report. This report produces three outputs, labels, magnetic tape, or a printed list of accounts ordering Pay-Per-View events, with or without detailed listing.

PVLIST—Pay-Per-View Event Detail Report. This report provides a summary or a detailed list of all orders for selected events that occur in a specified date range. Option include a summary of purchases by event date and channel, a list of ANI orders by issue date, or a summary of purchases by the date and time of the purchase.

PVTITL—Pay-Per-View Title Summary Report. This report lists all Pay-Per View titles within the specified date range.

RECONV—Services/Converter Reconciliation. This report compares services for each account to the converters currently assigned to the account, and then lists the exceptions.

REDRES—Audit Listing for Rebuild. Similar to the AUDITS report, this report provides an audit listing and control listing of a specified number of addresses selected street, sales route, apartment code, zip code, dwelling type and serviceability.

REFSUM—Account Refund Summary Report. This report lists pending and completed refund requests.

REFUND—Disconnected Accounts/Credit Balance. This report includes accounts with disconnect work orders and a credit balance which were completed during the specified date range.

REMIND—Reminder Report. This report lists the type of reminder messages, sorted by operator and by date due.

REPCAL—Repeat Service Call Report. This report lists all accounts with multiple service calls during the specified date range.

REVNUE—Earned Revenue Report. This report computes earned revenue for all service levels and subscriber types.

RTABLE—System Rate Table Listing. This report lists all rates charged for services.

SBLIFE—Subscriber Life Analysis. This report lists the service life of all subscribers, by franchise.

SELLST—Selection Definition Listing. This report lists call selection definitions for the Selective Massaging and Selective Insertion Program.

SERVIN—Random Subscriber List by Install Date. This report produces a random sample of subscribers who were installed during the specified date range. The sample includes the subscriber name, address, social security number, telephone number, and service level.

SERVSO—Random Subscriber/Trouble Call List. This report produces a random sample of trouble calls within a specified date range. The sample includes the subscriber name, address, social security number, phone, and service level.

SLSCOM—Sales Commission Report. This report summarizes the daily activity of completed work orders by schedule date and service level.

SLSCRD—Sales Call Cards. This program creates sales leads by sales route, dwelling status, dwelling type, and apartment codes.

SMCAMP—Salesman Summary, by Campaign. This report is used for sales incentive programs, such as Excel or the Honor Roll. This report tracks a user's sales activity by campaign.

SMCLUS—Cluster Retention Report. This report lists all orders entered for the specified campaigns and cluster codes. It summarizes retention information based on subsequent downgrades and disconnects.

SMCOMM—Sales Commission by Campaign. This report is for sales incentive programs, such as the Excel or Honor Roll Program. This report determines direct sales and telemarketing commissions. It summarizes sales activity based on work order campaigns.

SMCMOP—Sales Commission Campaign/Operator. This report is for sales incentive programs, and summarizes activity based on campaigns or operators.

SMOPER—Salesman Summary Report. This report summarizes sales activities for sales incentive programs and verifies that the downgrades and disconnects are evenly spread between the users.

SMRETN—Salesman Retention Report. This report lists all orders entered for each campaign selected, and summarizes retention information based on subsequent downgrades and disconnects.

SRATES—Service Rate Summary Report. This report lists all non-standard service rates and the number of subscribers billed for each service.

SROPER—Collections Operator Report. This report lists all accounts in the collections database assigned to a specific operator. The report can be sorted by account number, name, or address.

STRDM—Street/Alternate Names Listing. This report lists all streets by franchise, and lists alternate names for the streets, if applicable.

STRDWL—Street Listing of Dwellings. This report produces a detailed list of all dwellings on the specified street(s).

STRHST—Account Activity by Street. This report lists current and previous subscribers for each dwelling on the specified street(s).

STRLST—Street File Listing. This report lists all streets and their alternate names.

SUBLST—Generalized Subscriber Report. This report lists subscribers, selected by franchise, billing cycle, account status, or subscriber type. The list includes the subscriber's account number, name, address, phone number, account balance, account status, and service level.

SUBRND—Random Subscriber Listing. This report produces a random listing of subscribers, showing subscriber name, address, social security number, telephone number, and service level.

SUBSVO—Subscriber Service Call Report. This report lists subscribers with service calls on record.

SVCLST—System Services Report. This report lists current and previous rates for each service.

SVCDWG—Subscriber List/Downgraded Services. This report lists subscribers who have dropped one or more services. Users may select accounts with various service levels, dropped services by date range, exclude accounts in collections, and optionally create mailing labels.

SVOCPL—Completed Service Call Report. This report lists completed service calls during the specified date range, with the number of days to complete the call, and or optional detailed description of each call.

SVOEAC—Service Orders by Technical Action Code. This report produces a summary of completed calls by technical action code, and may produce a detailed account of each qualifying call.

SVOEQC—Service Orders by Equipment Code. This report produces a summary of completed calls by equipment (component) code, and may produce a detailed description of each qualifying call.

SVOINC—Incomplete Service Order Listing. This report lists incomplete service orders not scheduled for a future date. This report includes a brief description of each call.

SVOINQ—Generalized Service Order Listing. This report lists service orders that fit the specified qualifications.

SVOMAT—Incomplete Trouble Call Report. This report lists all incomplete trouble orders by sector, producing an optional trouble code/sector matrix.

SVOOSD—Monthly Service Calls. This report summarizes completed service orders by category for the date range selected.

SVORET—Returned Service Call Report. This report lists the total of returned service calls for the specified date range, with an optional detailed description of each call.

SVOSCH—Scheduled/Incomplete Service Order List. This report lists incomplete service orders by scheduled date or date received. it also lists comments, trouble order code, and the number of times the order was returned.

SVOSUM—Weekly Service Call Report. This report summarizes completed service orders by category for the specified date range, with an optional detailed list of qualified or excluded calls.

SVOTBC—Service Orders by Trouble Code. This report produces a summary of completed calls by trouble code, with an optional detailed description of each call.

SVSUMM—Services D/C Summary Report. This report summarizes all debit/credit entries for services, by the debit/credit reason.

TCRSUM—Trouble Call Time Summary Report. This report, which is used for NCTA Standards reporting summarizes completed trouble orders by category for the selected time range.

TECSUM—Technician Service Order Completion. This report produces a summary of completed calls, by technician, for the specified week.

TELAIG—Teledirect Subscriber Report. This report lists subscribers for telemarketing contact using a Teledirect Teleprompter. The subscribers are selected by sales route, cluster code, account/non-account, and invalid primary phone number.

Other reports are available which are used with the Teledirect Teleprompter. The output of these reports is a list of subscribers. These reports include:

TELCMP—Teledirect Campaign Report.

TELCUR—Teledirect Current Subscriber list for Applied Information Group ("AIG").

TELDIS—Teledirect Disconnected Subscribers.

TELDWG—Teledirect Pending Downgrades/Discontinueds.

TEUMR—Teledirect Former Subscriber list for AIG.

TEUNS—Teledirect Pending Install Report.

TELNVR—Teledirect Never Subscriber List for AIG.

TELRET—Teledirect Retention Report.

TELEMK—Telemarketing Report. This report lists all accounts within a specified date range and specified work order type.

TELUPG—Teledirect Upgrade Report. This report produces a call file for the Teledirect Predictive Dialer. A detail report is also generated.

UNASGN—Unassigned Service Order Report. This report lists all unassigned service orders by sector.

UNSCHD—Unscheduled Work Order Report. This report lists all unscheduled work orders, and includes phone numbers. The list is sorted by salesmen (and CSRs) to distribute the scheduling work among those who are responsible for the order.

USRLST—SAM User Directory. This report lists all SAM users, including the user name, operator number, address, phone, dept., job title, and supervisor.

WKDLST—Week Definition Listing. This report lists defmed points by week definition set up in the WOS function, by days of the week, and by day-parts.

WOBACK—Back Dated Work Orders. This report guards against excessive refunds or credits. It lists all work orders completed with an effective date more than the specified number of days previous to the completion date.

WOCANX—Canceled Work Order Listing. This report lists all work orders canceled over a specific date range. The list is sorted by campaign name, address, reason canceled, or date canceled.

WODWEL—Work Order Dwelling Type Report. This report summarizes the activity of completed work orders by the specified date range, service, type, and whether the installer is an employee or a contractor.

WOLABL—Work Order Activity Mailing Labels. This report produces mailing labels based on work orders completed between the specified dates.

WORSUM—Work Order Response Time Analysis. This report, which is used for NCTA Standards reporting, summarizes the response time required to complete work orders by order type during the selected date range.

WOSUMM—Work Order Summary Report. This report summarizes the activity of completed work orders by the specified date range and service type.

WPSCHD—Work Order Schedule Report. This report lists pending work orders by sector for a selected date range. This report can be used to pull points from future days in order to maximize points in each sector for each day.

WPSUMM—Work-ln-Process Summary Listing. This report summarizes in-process work orders, giving total orders and net service changes by schedule date and by work order type.

WRKGEN—Work-ln-Progress by Issue Date. This report summarizes pending and completed work orders by issue date range. The output is sorted by salesman and campaign.

WRKISS—Work Order by Issue Date. This report summarizes pending and completed work orders by salesman for a specified date range.

WSCHED—Work Order Scheduling Points/Usage. This report summarizes the scheduling points available for the specified date range, with a breakdown of how the points are used.

ZIPLST—Addresses by Zip Code. This report lists all active addresses within a given zip code, or given zip+4 specification.

5.5. Billing

The present invention generates bills for the subscribers in the system. Bills can be generated on a regular periodic basis (usually monthly, but also quarterly, semi-annually and annually), on a special event basis (for example, upon viewing a specific pay-for-view event), or otherwise. The system is capable of handling more than one bill per month to an individual subscriber. The system is also capable of handling up to 31 billing cycles per month.

Upon indication of a billing generation requirement for a particular subscriber, the present invention accesses the database for that subscriber, collects current unbilled usage data for billing (including regular monthly fees, pay-for-view fees, and equipment and maintenance charges), historical information (such as balances forwarded and recent payments yet to be credited), and any other information to be included on the bill (such as announcements and advertising). The invention then prepares a bill for the subscriber on a standard format. The bill images are sent to a printing house where they are printed, placed in individual envelopes, and mailed to each subscriber. Then, the system's databases are updated accordingly (particularly regarding indications of what has been billed and is now an account receivable).

The present invention can also generate mailing labels from the databases for subscribers and dwellings.

5.6. Ancillary Functions

The ancillary functions of the present invention include: SAM reports, electronic mail (e-mail), the Editor (word processing), the phone utility, personal computer function, Digital Equipment's office automation software package, ALL-IN-ONE (Trademark), LOTUS 1-2-3 (Trademark) for the VAX, and WORDPERFECT (Trademark). The generation of SAM reports are the only one of these ancillary functions which use a CCI-created software product. The other ancillary functions are performed by software products from unrelated vendors.

The SAM report screens are designed to be user friendly. Each report screen contains a brief description of the report, plus on- line instructions for entering data to the final report output. These reports can be generated, printed and viewed.

SAM uses the Digital Equipment Corp. (DEC) VMS electronic mail utility. This allows the user to send and receive messages to other users within the system, or any other system in the network. The user can also file, forward, delete, reply to, and print messages that have been received.

The Editor is a simple word processing program that is available to all SAM users for producing printed documents such as memos and letters. The Editor is also useful for searching for accounts and names in a large document and for editing down print jobs when a printer jams.

The phone utility allows the user to communicate with others on the system Qr any system in the SAM network. The phone function is designed to simulate some features of real telephone communications.

The SAM system can be used as a PC (personal computer). This allows users with a proper configuration to access the SAM source code, ALL-IN-ONE (Trademark), Lotus/VAX, or Word Perfect/VAX through a PC using either the Reflections or Pathworks software.

All-in-one is an office automation software package provided by the Digital Equipment Corporation.

LOTUS-1-2-3 (Trademark)/VAX is available on the present invention.

WORDPERFECT(Trademark)/VAX is also made available to users on the present invention.

5.7. Summary of a Method

Figure 15:
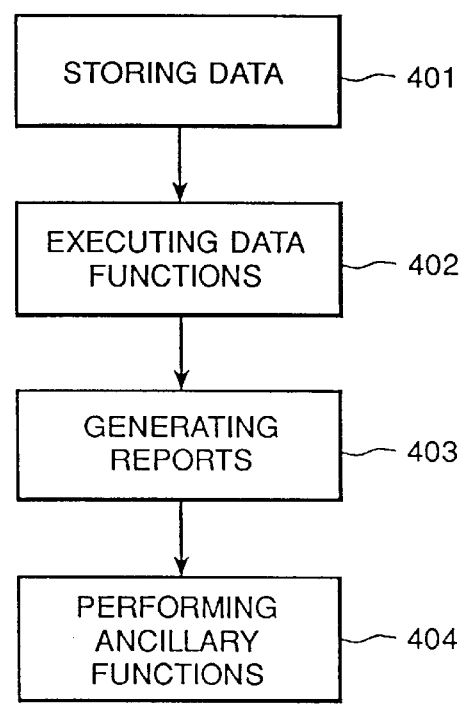
FIG. 15 shows a flow chart of the basic steps of a method of the present invention.

FIG. 15 shows a flow chart of the basic steps of a method of the present invention, comprising the steps of: storing 401 with programmed computer means types of data for telecommunication services, executing 402 with programmed computer means data functions on such data to change such data to reflect current activity, generating 403 with programmed computer means reports from such data, and performing 404 with programmed computer means ancillary functions on the data.

In this method the types of data may include one or more of: data for individual user accounts for telecommunication services, data for equipment for provision of telecommunication services, data for cable system converters, and data for the locations serviced by the telecommunication services.

The stored data may be stored in compatible formats.

The telecommunication services may include one or more of: cable television, direct-to-home satellite television including pay-per-view services, direct from satellite telephone, interactive telecommunications, non-interactive telecommunications, telephone, on-line databases, video conferencing, radio, pay-for-view television, pay-for-call telephone, interfacing to imaging systems, video, audio, television, music video, video juke box, video-on-demand, interactive television, home-shopping, telephone conferencing, and automatic charge-back telephone calls.

The data functions may include one or more of display user functions, menu user functions, and supervisor functions, where: (i) the display user functions may include one or more of: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, transaction history view, transaction processing system view, plant inventory view, and work order; (ii) the menu user functions may include one or more of: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, transaction history tracking, transaction processing system tracking, plant inventory tracking, and related functions, and (iii) the supervisor functions and reports may include one or more of: accounting functions, functions to manage users, reports, and miscellaneous functions.

The types of reports may include one or more of: reports run on a daily basis, reports run on a weekly basis, reports run on a monthly basis, transaction history reports, transaction processing system reports, plant inventory reports, and reports run on an as-needed basis.

The ancillary functions may include one or more of: SAM reports, electronic mail, word processing, a phone utility, a personal computer function, office automation software packages, and spread sheets.

The data may be stored in a network of computers installed in offices of cable television systems, with separate databases maintained for each office.

The types of reports may include one or more of: reports for technical personnel, reports for warehouse personnel, reports for accounting/collection personnel, reports for work order control personnel, reports for dispatchers, and reports for pay-per-view activity.

This method may also include the step of performing, with programmed computer means, addressable converter interaction functions to remotely change the list of services that an individual addressable converter will permit an individual subscriber to access.

5.8. Other Comments

For convenience of expression the term "telecommunication" is often used herein. This means in this specification and claims all telecommunications, including interactive and non-interactive telecommunications.

Although the embodiments of this invention to date involve cable television systems, the invention is readily applicable to any subscription or pay-for-view or pay-for-use telecommunication service. The invention also can be used for satellite telecommunication services, direct-to-home satellite television or telephone services, including pay-per-view services, wireless telephone services, ground line telephone services (including wired and fiber-optic systems), private phone systems, data communication systems, on-line database communication systems, and others. The invention can be used for multi-channel telecommunication services (such as cable television), for single channel multi-service subscription telecommunication services (such as is common with local wired telephone service and wireless telephones today). Furthermore, the invention can be used by new mixes of subscription or pay-for-use telecommunication services in the future, for example, telephone service offered by cable companies, or services using cable companies through the 10 million bit per second (10M bps) cable modem, or services offered by cable companies together with wireless or wired telephone, or on-line data services.

Also, the present invention can use a variety of hardware environments. For example, although the invention has to date been used only on computer networks or stand-alone computers, the invention may also be used in other computer architecture configurations, or on other types of programmable equipment.

The embodiments described herein are merely illustrative of the principles of this invention. Other arrangements and advantages may be devised by those skilled in the art without departing from the spirit and scope of the invention. Accordingly, the invention should be deemed not to be limited to the above detailed description but only by the spirit and scope of the claims which follow, and their equivalents.

"SAM" is a trademark of Continental Cablevision, Inc., of Boston, Mass.

We claim:
1. An apparatus comprising:
  a. programmed computer means for storing types of user account management data for telecommunication services;
  b. programmed computer means for executing user account management data functions on such user account management data to change such user account management data to reflect current activity;
  c. programmed computer means for generating types of reports from such user account management data;
  d. programmed computer means for performing ancillary functions on the user account management data;
  e. programmed computer means for performing addressable converter interaction functions to remotely change the list of services that an individual addressable converter will permit an individual subscriber to access.

2. The apparatus in claim 1 where the types of data include at least one of: data for individual user accounts for telecommunication services, data for equipment for provision of telecommunication services, data for cable system converters, and data for the locations serviced by the telecommunication services.

3. The apparatus in claim 1 where the stored data is stored in compatible formats.

4. The apparatus in claim 1 where the telecommunication services include at least one of: cable television, direct-to-home satellite television including pay-per-view services, direct from satellite telephone, interactive telecommunications, non-interactive telecommunications, telephone, on-line databases, video conferencing, radio, pay-for-view television, pay-for-call telephone, interfacing to imaging systems, video, audio, television, music video, video juke box, video-on-demand, interactive television, home-shopping, telephone conferencing, and automatic charge-back telephone calls.

5. The apparatus in claim 1 where the types of reports include at least one of: reports run on a daily basis, reports run on a weekly basis, reports run on a monthly basis, transaction history reports, transaction processing system reports, plant inventory reports, and reports run on an as-needed basis.

6. The apparatus in claim 1 where the ancillary functions include at least one of: SAM reports, electronic mail, word processing, a phone utility, a personal computer function, office automation software packages, and spread sheets.

7. The apparatus in claim 1 where the programmed computer means for storing data comprises a network of computers installed in offices of cable television systems, with separate databases maintained for each office.

8. The apparatus in claim 1 where the types of reports include at least one of: reports for technical personnel, reports for warehouse personnel, reports for accounting/collection personnel, reports for work order control personnel, reports for dispatchers, and reports for pay-per-view activity.

9. The apparatus in claim 1 where the data functions include at least one of: display user functions, menu user functions, and supervisor functions.

10. The apparatus in claim 9 where the display user functions include at least one of: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, transaction history view, transaction processing system view, plant inventory view, and work order.

11. The apparatus in claim 9 where the menu user functions include at least one of: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, transaction history tracking, transaction processing system tracking, and plant inventory tracking.

12. The apparatus in claim 9 where the supervisor functions and reports include at least one of: accounting functions, functions to manage users, and reports.

13. A method comprising:
  a. storing, with programmed computer means, types of user account management data for telecommunication services;
  b. executing, with programmed computer means, user account management data functions on such user account management data to change such user account management data to reflect current activity;

c. generating, with programmed computer means, types of reports from such user account management data;

d. performing, with programmed computer means, ancillary functions on the user account management data; and e. performing, with programmed computer means, addressable converter interaction functions to remotely change the list of services that an individual addressable converter will permit an individual subscriber to access.

14. The method in claim 13 where the types of data include at least one of: data for individual user accounts for telecommunication services, data for equipment for provision of telecommunication services, data for cable system converters, and data for the locations serviced by the telecommunication services.

15. The method in claim 13 where the stored data is stored in compatible formats.

16. The method in claim 13 where the telecommunication services include at least one of: cable television, direct-to-home satellite television including pay-per-view services, direct from satellite telephone, interactive telecommunications, non-interactive telecommunications, telephone, on-line databases, video conferencing, radio, pay-for-view television, pay-for-call telephone, interfacing to imaging systems, video, audio, television, music video, video juke box, video-on-demand, interactive television, home-shopping, telephone conferencing, and automatic charge-back telephone calls.

17. The method in claim 13 where the types of reports include at least one of: reports ran on a daily basis, reports ran on a weekly basis, reports run on a monthly basis, transaction history reports, transaction processing system reports, plant inventory reports, and reports run on an as-needed basis.

18. The method in claim 13 where the ancillary functions include at least one of: SAM reports, electronic mail, word processing, a phone utility, a personal computer function, office automation software packages, and spread sheets.

19. The method in claim 13 where the data is stored in a network of computers installed in offices of cable television systems, with separate databases maintained for each office.

20. The method in claim 13 where the types of reports include at least one of: reports for technical personnel, reports for warehouse personnel, reports for accounting/collection personnel, reports for work order control personnel, reports for dispatchers, and reports for pay-per-view activity.

21. The method in claim 13 where the data functions include at least one of: display user functions, menu user functions, and supervisor functions.

22. The method in claim 21 where the display user functions include at least one of: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, transaction history view, transaction processing system view, plant inventory view, and work order.

23. The method in claim 21 where the menu user functions include at least one of: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, transaction history tracking, transaction processing system tracking, and plant inventory tracking.

24. The method in claim 21 where the supervisor functions and reports include at least one of: accounting functions, functions to manage users, and reports.

25. An article of manufacture comprising:

a computer readable medium having computer readable program code means embodied therein, the computer readable program code means in said article of manufacture comprising:

a. computer readable code means for causing a computer to effect storing types of user account management data for subscriber cable television service; the types of user account management data further comprising: data for individual subscriber accounts for cable television service, data for equipment for provision of subscriber cable television service, data for cable television system converters, and data for dwellings serviced by subscriber cable television service; the stored data being stored in compatible formats; and the means for storing types of data further comprise: a programmed computer network installed in offices of cable television systems, with separate databases maintained for each office, b. computer readable code means for causing a computer to effect executing user account management data functions on such user account management data to change such user account management data to reflect current activity, the user account management data functions further comprise display user functions, menu user functions, and supervisor functions, where:

(i) the display user functions further comprise: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, and work order, (ii) the menu user functions further comprise: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, and related functions, and (iii) the supervisor functions and reports further comprise: accounting functions, functions to manage users, reports, and miscellaneous functions, c. computer readable code means for causing a computer to effect generating types of reports from such user account management data, the types of reports further comprising: reports for technical personnel, reports for warehouse personnel, reports for accounting/collection personnel, reports for work order control personnel, reports for dispatchers, and reports for pay-per-view activity, and d. computer readable code means for causing a computer to effect performing ancillary functions on the user account management data, the ancillary functions further comprising: SAM reports, electronic mail, word processing, a phone utility, a personal computer function, office automation software packages, and spread sheets.

26. An article of manufacture comprising:
a computer readable medium having computer readable program code means embodied therein, the computer readable program code means in said article of manufacture comprising:
   a. computer readable code means for causing a computer to effect storing with programmed computer means types of user account management data for telecommunication services;
   b. computer readable code means for causing a computer to effect executing with programmed computer means user account management data functions on such user account management data to change such user account management data to reflect current activity;
   c. computer readable code means for causing a computer to effect generating with programmed computer means types of reports from such user account management data; and
   d. computer readable code means for causing a computer to effect performing with programmed computer means ancillary functions on the user account management data; and
   e. computer readable code means for causing a computer to effect programming with programmed computer means addressable converter interaction functions to change remotely the list of services that an individual addressable converter will permit an individual subscriber to access.

27. An article of manufacture as in claim 26 where the types of user account management data include at least one of: data for individual user accounts for telecommunication services, data for equipment for provision of telecommunication services, data for cable system converters, and data for the locations serviced by the telecommunication services.

28. An article of manufacture as in claim 26 where the stored data is stored in compatible formats.

29. An article of manufacture as in claim 26 where the telecommunication services include at least one of: cable television, direct-to-home satellite television including pay-per-view services, direct from satellite telephone, interactive telecommunications, non-interactive telecommunications, telephone, on-line databases, video conferencing, radio, pay-for-view television, pay-for-call telephone, interfacing to imaging systems, video, audio, television, music video, video juke box, video-on-demand, interactive television, home-shopping, telephone conferencing, and automatic charge-back telephone calls.

30. An article of manufacture as in claim 26 where the types of reports include at least one of: reports run on a daily basis, reports run on a weekly basis, reports run on a monthly basis, transaction history reports, transaction processing system reports, plant inventory reports, and reports run on an as-needed basis.

31. An article of manufacture as in claim 26 where the ancillary functions include at least one of: SAM reports, electronic mail, word processing, a phone utility, a personal computer function, office automation software packages, and spread sheets.

32. An article of manufacture as in claim 26 where the user account management data is stored in a network of computers installed in offices of cable television systems, with separate databases maintained for each office.

33. An article of manufacture as in claim 26 where the types of reports include at least one of: reports for technical personnel, reports for warehouse personnel, reports for accounting/collection personnel, reports for work order control personnel, reports for dispatchers, and reports for pay-per-view activity.

34. An article of manufacture as in claim 26 where the user account management data functions include at least one of: display user functions, menu user functions, and supervisor functions.

35. An article of manufacture as in claim 34 where the display user functions include at least one of: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, transaction history view, transaction processing system view, plant inventory view, and work order.

36. An article of manufacture as in claim 34 where the menu user functions include at least one of: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, transaction history tracking, transaction processing system tracking, and plant inventory tracking.

37. An article of manufacture as in claim 34 where the supervisor functions and reports include at least one of: accounting functions, functions to manage users, and reports.

38. A program storage device readable by a machine, tangibly embodying a program of instructions executable by the machine to perform a method comprising:
   a. storing types of user account management data for subscriber cable television service; the types of data further comprising: data for individual subscriber accounts for cable television service, data for equipment for provision of subscriber cable television service, data for cable television system converters, and data for dwellings serviced by subscriber cable television service; the stored data being stored in compatible formats; and the means for storing types of data further comprise: a programmed computer network installed in offices of cable television systems, with separate databases maintained for each office,
   b. executing user account management data functions on such user account management data to change such user account management data to reflect current activity, the user account management data functions further comprise display user functions, menu user functions, and supervisor functions, where:
      (i) the display user functions further comprise: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, and work order,
      (ii) the menu user functions further comprise: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, and related functions, and (iii) the supervisor functions and reports further comprise: accounting functions, functions to manage users, reports, and miscellaneous functions, c. generating types of reports from such user account management data, the types of reports further comprising: reports for technical personnel, reports for warehouse personnel, reports for accounting/collection personnel, reports for work order control personnel, reports for dispatchers, and reports for pay-per-view activity, and d. performing ancillary functions on the user account management data, the ancillary functions further comprising: SAM reports, electronic mail, word processing, a phone utility, a personal computer function, office automation software packages, and spread sheets.

39. A program storage device readable by a machine, tangibly embodying a program of instructions executable by the machine to perform a method comprising:

e. storing with programmed computer means types of user account management data for telecommunication services;

f. executing with programmed computer means user account management data functions on such user account management data to change such user account management data to reflect current activity;

g. generating with programmed computer means types of reports from such user account management data;

h. performing with programmed computer means ancillary functions on the user account management data; and i. performing with programmed computer means addressable converter interaction functions to change remotely the list of services that an individual addressable converter will permit an individual subscriber to access.

40. A program storage device as in claim 39 where the types of user account management data include at least one of: data for individual user accounts for telecommunication services, data for equipment for provision of telecommunication services, data for cable system converters, and data for the locations serviced by the telecommunication services.

41. A program storage device as in claim 39 where the stored user account management data is stored in compatible formats.

42. A program storage device as in claim 39 where the telecommunication services include at least one of: cable television, direct-to-home satellite television including pay-per-view services, direct from satellite telephone, interactive telecommunications, non-interactive telecommunications, telephone, on-line databases, video conferencing, radio, pay-for-view television, pay-for-call telephone, interfacing to imaging systems, video, audio, television, music video, video juke box, video-on-demand, interactive television, home-shopping, telephone conferencing, and automatic charge-back telephone calls.

43. A program storage device as in claim 39 where the types of reports include at least one of: reports run on a daily basis, reports run on a weekly basis, reports run on a monthly basis, transaction history reports, transaction processing system reports, plant inventory reports, and reports run on an as-needed basis.

44. A program storage device as in claim 39 where the ancillary functions include at least one of: SAM reports, electronic mail, word processing, a phone utility, a personal computer function, office automation software packages, and spread sheets.

45. A program storage device as in claim 39 where the user account management data is stored in a network of computers installed in offices of cable television systems, with separate databases maintained for each office.

46. A program storage device as in claim 39 where the types of reports include at least one of: reports for technical personnel, reports for warehouse personnel, reports for accounting/collection personnel, reports for work order control personnel, reports for dispatchers, and reports for pay-per-view activity.

47. A program storage device as in claim 39 where the user account management data functions include at least one of: display user functions, menu user functions, and supervisor functions.

48. A program storage device as in claim 47 where the display user functions include at least one of: alternate address functions, collection activity, dwelling, drop burial, equipment functions, financial adjustment, inquiry logging, request-for-action job, letters, memos, order entry, printing, telephone interface, reminders, subscriber information, trouble orders, utilities, pay-per-view, transaction history view, transaction processing system view, plant inventory view, and work order.

49. A program storage device as in claim 47 where the menu user functions include at least one of: SAM menu functions, customer service functions, miscellaneous job functions, drop burial inquiry, dispatch, converter tracking, dwelling management, billing and collection, payment processing, and work order calendar and points; and the billing and collection functions include generation of bills, generation of disconnect notices, payment processing, transaction history tracking, transaction processing system tracking, and plant inventory tracking.

50. A program storage device as in claim 47 where the supervisor functions and reports include at least one of: accounting functions, functions to manage users, and reports.

* * * * *

UNITED STATES PATENT AND TRADEMARK OFFICE
CERTIFICATE OF CORRECTION

PATENT NO. : 5,884,284
DATED : March 16, 1999
INVENTOR(S) : J. Michael Peters, et. al.

It is certified that error appears in the above-identified patent and that said Letters Patent is hereby corrected as shown below:

Title page, item [73], Assignee: should be changed from Continental Cable Vision, Inc. to "Media One Group, Inc. and US West Inc."

Signed and Sealed this

Thirtieth Day of November, 1999

Attest:

Attesting Officer

Q. TODD DICKINSON

Acting Commissioner of Patents and Trademarks